(12) United States Patent
Kumazaki et al.

(10) Patent No.: US 8,113,987 B2
(45) Date of Patent: Feb. 14, 2012

(54) CONTROL DEVICE FOR HYBRID VEHICLE DRIVE APPARATUS

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 948 days.

(21) Appl. No.: 12/078,861

(22) Filed: Apr. 7, 2008

(65) Prior Publication Data

US 2008/0254934 A1    Oct. 16, 2008

(30) Foreign Application Priority Data

Apr. 13, 2007    (JP) .................................. 2007-106468

(51) Int. Cl.
| | |
|---|---|
| B60W 10/02 | (2006.01) |
| B60W 10/08 | (2006.01) |
| B60W 10/04 | (2006.01) |
| B60K 6/445 | (2007.10) |
| H02P 15/00 | (2006.01) |
| H02P 17/00 | (2006.01) |
| F16H 3/72 | (2006.01) |
| F16H 37/06 | (2006.01) |

(52) U.S. Cl. ......... 477/15; 477/5; 477/6; 477/8; 477/16; 477/20; 475/2; 475/5; 180/65.235

(58) Field of Classification Search .................. 477/3–9, 477/15, 16; 475/1–10; 180/65.21, 65.235; 903/945

See application file for complete search history.

(56) References Cited

U.S. PATENT DOCUMENTS

| | | | |
|---|---|---|---|
| 5,771,478 A | 6/1998 | Tsukamoto et al. | |
| 5,775,449 A | 7/1998 | Moroto et al. | |
| 5,934,395 A | 8/1999 | Koide et al. | |
| 6,018,199 A | 1/2000 | Shiroyama et al. | |
| 6,146,302 A | 11/2000 | Kashiwase | |
| 6,383,106 B1 | 5/2002 | Kashiwase | |
| 7,749,131 B2* | 7/2010 | Imamura et al. .................. 477/3 |
| 7,980,991 B2* | 7/2011 | Kumazaki et al. .............. 477/15 |
| 2002/0091028 A1 | 7/2002 | Kashiwase | |
| 2004/0254046 A1* | 12/2004 | Ozeki et al. ........................ 477/3 |
| 2005/0203678 A1* | 9/2005 | Suzuki et al. .................... 701/22 |
| 2005/0209760 A1* | 9/2005 | Tabata et al. .................... 701/53 |
| 2005/0247495 A1* | 11/2005 | Tabata et al. ................. 180/65.2 |

(Continued)

FOREIGN PATENT DOCUMENTS

JP    A-07-336810    12/1995

(Continued)

*Primary Examiner* — Tisha Lewis
(74) *Attorney, Agent, or Firm* — Oliff & Berridge, PLC

(57) ABSTRACT

A control device for hybrid vehicle drive apparatus has a differential mechanism operative to perform a differential action and an electric motor. The control device prevents a second electric motor from reaching a high-speed rotation with a likelihood of degradation occurring in durability of the second electric motor when a "D" position is switched into an "N" position during a running of a vehicle. When a shift lever (49) is shifted into the "N" position during the vehicle running to interrupt a power transmitting path of an automatic shifting portion (20), a differential action of a power distributing mechanism (16) is limited. A limited differential action suppresses increases in rotation speeds of rotary members such as a clutch or a brake of the automatic shifting portion (20), a second electric motor (M2) and a differential-portion planetary gear (P0) or the like. Thus, degradation in durability of such rotary members due to high-speed rotations thereof can be minimized.

39 Claims, 10 Drawing Sheets

U.S. PATENT DOCUMENTS

2008/0196955 A1* 8/2008 Minamikawa ............... 180/65.2
2009/0248265 A1* 10/2009 Tabata et al. .................... 701/59

FOREIGN PATENT DOCUMENTS

| JP | A-08-135762 | 5/1996 |
| JP | A-09-170533 | 6/1997 |
| JP | A-11-217025 | 8/1999 |
| JP | A-11-270445 | 10/1999 |
| JP | A-2003-193878 | 7/2003 |
| JP | A-2005-264762 | 9/2005 |
| JP | A-2006-002913 | 1/2006 |

* cited by examiner

| | C0 | C1 | C2 | B0 | B1 | B2 | B3 | SHIFTING RATIO | STEP | |
|---|---|---|---|---|---|---|---|---|---|---|
| 1st | ◎ | ○ | | | | | ○ | 3.357 | 1.54 | |
| 2nd | ◎ | ○ | | | | ○ | | 2.180 | 1.53 | |
| 3rd | ◎ | ○ | | | ○ | | | 1.424 | 1.42 | |
| 4th | ◎ | ○ | ○ | | | | | 1.000 | 1.42 | |
| 5th | | ○ | ○ | ◎ | | | | 0.705 | TOTAL 4.76 | |
| R | | | ○ | | | | ○ | 3.209 | | |
| N | | | | | | | | | | |

○ ENGAGED
◎ ENGAGED UPON STEP-VARIABLE
RELEASED UPON CONTINUOUSLY-VARIABLE

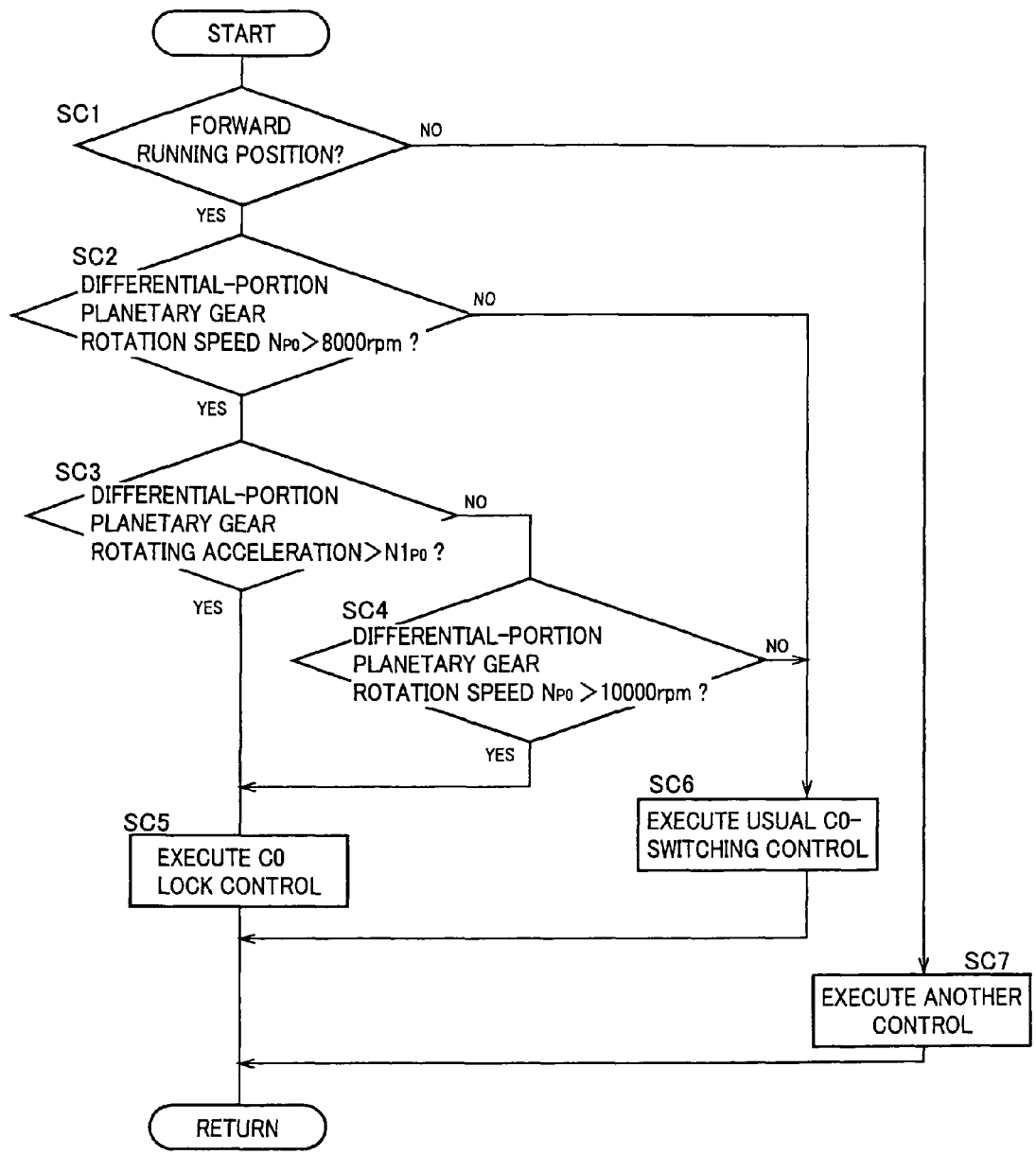

CONTROL DEVICE FOR HYBRID VEHICLE DRIVE APPARATUS

TECHNICAL FIELD

The present invention relates to a control device for hybrid vehicle drive apparatus having a differential mechanism operative to perform a differential action, an electric motor and a mechanical shifting portion. More particularly, this invention relates to a control device for preventing a rotation speed of a rotary element, forming part of a power transmitting path, from increasing when a rapid drop occurs in a load acting on an input shaft of the mechanical shifting portion during a running of a vehicle.

BACKGROUND ART

One type of hybrid vehicles is provided with an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a mechanical shifting portion forming part of the power transmitting path. The differential mechanism includes a differential-action limiting device with which the differential mechanism can be selectively switched into one of a differential state enabling the differential action and a non-differential state disenabling the differential action. When starting up the engine, the control device operates to rotate the first and second electric motors utilizing the differential action of the differential mechanism for drivably rotate the engine for startup thereof.

Such a control device for hybrid vehicle drive apparatus is disclosed in, for instance, Patent Publication 1 (JP No. 2005-264762). Besides, Patent Publication 2 (JP No. 2003-193878) and Patent Publication 3 (JP No. 2006-2913) disclose technologies that are known in the art.

With such a hybrid vehicle drive apparatus disclosed in, for instance, Patent Publication 1, when the vehicle is driven with at least the engine to run at a high speed, if a vehicle occupant operates to switch a shift position from a "D" position to an "N" position, then, a provability takes place with a rapid drop occurring on a running load. Such a rapid drop in running load also takes place when the mechanical shifting portion has a large speed ratio with a fluctuation occurring in a decelerating direction.

Here, the running load acts in a direction to suppress an increase in rotation speed of the input shaft of the mechanical shifting portion. Thus, a rotation speed of a rotary element incorporated in the differential mechanism or the mechanical shifting portion, the second electric motor and associated engaging elements, connected to such component parts, rapidly increase, reaching high-speed rotations. This results in a likelihood of degradation occurring in durability of the rotary elements and the engaging elements.

SUMMARY OF THE INVENTION

The present invention has been completed with the above view in mind and has an object to provide a control device for hybrid vehicle drive apparatus, provided with a differential mechanism operative to perform a differential action and an electric motor, which can prevent a rotary element incorporated in the differential mechanism or the mechanical shifting portion, and the second electric motor from reaching high-speed rotations with a provability of causing degradation to occur in durability of such component parts. Such high-speed rotation occurs when a shift position is switched from a "D" position to an "N" position during a vehicle running with a rapid drop occurring on a running load acting in a direction, to suppress an increase in rotation speed of an input shaft of the mechanical shifting portion.

For achieving the above object, a first aspect of the present invention is featured by, in the control device for a hybrid vehicle drive apparatus, that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same; (b) the differential mechanism includes a differential-action limiting device enabling the differential action of the differential mechanism to be limited, that is for limiting the differential action of the differential mechanism; and (c) the control device is operative to cause the differential-action limiting device to limit the differential action of the differential mechanism, when a rotation speed of a rotary element, present on the power transmitting path rotatably, exceeds a given rotary-element rotation speed determining value.

A second aspect of the present invention is featured by, in the control device for a hybrid vehicle drive apparatus, that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same; (b) the differential mechanism includes a differential-action limiting device enabling the differential action of the differential mechanism to be limited, that is for limiting the differential action of the differential mechanism; and (c) the control device is operative to cause the differential-action limiting device to limit the differential action of the differential mechanism, when an increment of a rotation speed per unit time of a rotary element, present on the power transmitting path rotatably, exceeds a given rotary-element rotating acceleration determining value.

A third aspect of the present invention is featured by, in the control device for a hybrid vehicle drive apparatus, that the rotary-element rotating acceleration determining value is determined depending on the rotation speed of the rotary element.

A fourth aspect of the present invention is featured by, in the control device for a hybrid vehicle drive apparatus, that when the rotation speed of the rotary element exceeds the given rotary-element rotation speed determining value or the increment of the rotation speed per unit time of the rotary element exceeds the given rotary-element rotating acceleration determining value, the control device is operative to execute at least one of a drive control for driving the first electric motor so as to lower the rotation speed, a fuel supply stop control for stopping or limiting a fuel supply to the engine, and a fuel regulating-valve opening control for limiting an opening of a regulating valve for regulating intake air quantity being supplied to the engine.

A fifth aspect of the present invention is featured by, in the control device for a hybrid vehicle drive apparatus, that (a) the hybrid vehicle drive apparatus is provided with an engaging element enabling the power transmitting path to be interrupted; and (b) the rotation speed of the rotary element is a relative rotation speed of engaging members forming the engaging element.

A sixth aspect of the present invention is featured by, in the control device for a hybrid vehicle drive apparatus, that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same; (b) the differential mechanism includes a differential-action limiting device enabling the differential action of the differential mechanism to be limited, that is for limiting the differential action of the differential mechanism; and (c) the control device is operative to cause the differential-action limiting device to limit the differential action of the differential mechanism, when a rotation speed of the second electric motor exceeds a given second-motor rotation speed determining value.

A seventh aspect of the present invention is featured by, in the control device for a hybrid vehicle drive apparatus, that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same; (b) the differential mechanism includes a differential-action limiting device enabling the differential action of the differential mechanism to be limited, that is for limiting the differential action of the differential mechanism; and (c) the control device is operative to cause the differential-action limiting device to limit the differential action of the differential mechanism, when an increment of a rotation speed per unit time of the second electric motor exceeds a given second-motor rotating acceleration determining value.

A eighth aspect of the present invention is featured by, in the control device for a hybrid vehicle drive apparatus, that the second-motor rotating acceleration determining value is determined depending on the rotation speed of the second electric motor.

A ninth aspect of the present invention is featured by, in the control device for a hybrid vehicle drive apparatus, that when the rotation speed of the second electric motor exceeds the given second-motor rotation speed determining value or the increment of the rotation speed per unit time of the second motor exceeds the given second-motor rotating acceleration determining value, the control device is operative to execute at least one of a drive control for driving the first electric motor so as to lower the rotation speed, a fuel supply stop control for stopping or limiting a supply of fuel to the engine, and a fuel regulating-valve opening control for limiting an opening of a regulating valve for regulating the intake air quantity being supplied to the engine.

A tenth aspect of the present invention is featured by, in the control device for a hybrid vehicle drive apparatus, that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same; (b) the differential mechanism includes a differential-action limiting device enabling the differential action of the differential mechanism to be limited, that is for liming the differential action of the differential mechanism; and (c) the control device is operative to cause the differential-action limiting device to limit the differential action of the differential mechanism, when an absolute value of a rotation speed of a rotary element, incorporated in a planetary gear unit included in the differential mechanism, exceeds a given planetary-gear-unit rotation speed determining value.

An eleventh aspect of the present invention is featured by, in the control device for a hybrid vehicle drive apparatus, that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same; (b) the differential mechanism includes a differential-action limiting device enabling the differential action of the differential mechanism to be limited, that is for limiting the differential action of the differential mechanism; and (c) the control device is operative to cause the differential-action limiting device to limit the differential action of the differential mechanism, when an increment of an absolute value of a rotation speed per unit time of a rotary element, incorporated in a planetary gear unit included in the differential mechanism, exceeds a given planetary-gear-unit rotating acceleration determining value.

A twelfth aspect of the present invention is featured by, in the control device for a hybrid vehicle drive apparatus, that the planetary-gear-unit rotating acceleration determining value is determined depending on the absolute value of the rotation speed of the rotary element incorporated in the planetary gear unit.

A thirteenth aspect of the present invention is featured by, in the control device for a hybrid vehicle drive apparatus, that when the absolute value of the rotation speed of the rotary element incorporated in the planetary gear unit exceeds the planetary-gear-unit rotation speed determining value, or the increment of the absolute value of the rotation speed per unit time of the rotary element incorporated in the planetary gear unit exceeds the planetary-gear-unit rotating acceleration determining value, the control device is operative to execute at least one of a drive control for driving the first electric motor so as to lower the rotation speed, a fuel supply stop control for stopping or limiting a supply of fuel to the engine, and a fuel regulating-valve opening control for limiting an opening of a regulating valve for regulating the intake air quantity being supplied to the engine.

A fourteenth aspect of the present invention is featured by, in the control device for a hybrid vehicle drive apparatus, that the power interrupting section is an engaging element, which is able to interrupt the power transmitting path and is incorporated in a mechanical shifting portion functioning as a transmission.

A fifteenth aspect of the present invention is featured by, in the control device for a hybrid vehicle drive apparatus, that the rotary element, present on the power transmitting path rotatably, is a rotary element incorporated in a planetary gear unit forming a mechanical shifting portion functioning as a transmission.

A sixteenth aspect of the present invention is featured by, in the control device for a hybrid vehicle drive apparatus, that the rotary element incorporated in the planetary gear unit is planetary gears of the planetary gear unit.

A seventeenth aspect of the present invention is featured by, in the control device for a hybrid vehicle drive apparatus, that (a) the differential mechanism includes a first rotary element connected to the engine in a drive-force transmissive state, a second rotary element connected to the second electric motor in a drive-force transmissive state, and a third rotary element connected to the power transmitting path extending to the drive wheels; and (b) the differential-action limiting device is operative to suppress a relative rotation of at least two rotary elements among the first to third rotary elements for thereby limiting the differential action of the differential mechanism.

A eighteenth aspect of the present invention is featured by, in the control device for a hybrid vehicle drive apparatus, that the electrically controlled differential portion is rendered operative as a continuously variable transmission with controlling the operating state of the first electric motor.

According to the first aspect of the present invention, when the rotation speed of the rotary element such as, for instance, a clutch, a brake or a bearing, present on the power transmitting path rotatably, exceeds the given rotary-element rotation speed determining value, the control device causes the differential-action limiting device to limit the differential action of the differential mechanism. Such a limited differential action causes rotational resistance of the engine connected to such a differential mechanism, to suppress an increase in rotation speed of the rotary element present on the power transmitting path connected to such a differential mechanism. This results in an effect of suppressing degradation in durability of such a rotary element resulting from a high-speed rotation thereof.

According to the second aspect of the present invention, when the increment of the rotation speed per unit time of the rotary element, present on the power transmitting path rotatably, exceeds the given rotary-element rotating acceleration determining value, the control device causes the differential-action limiting device to limit the differential action of the differential mechanism.

That is, even when the rotation speed of the rotary element does not exceed the given rotary-element rotation speed determining value, the excess of the rotation speed of the rotary element over the given rotary-element rotation speed determining value is predicted based on a variation in the rotation speed, the control device causes the differential-action limiting device to limit the differential action of the differential mechanism. Such a limited differential action causes rotational resistance of the engine connected to the differential mechanism, to suppress an increase in rotation speed of the rotary element present on the power transmitting path connected to such a differential mechanism. This results in an effect of suppressing degradation in durability of such a rotary element due to a high-speed rotation thereof.

According to the third aspect of the present invention, the rotary-element rotating acceleration determining value is determined depending on the rotation speed of the rotary element present on the power transmitting path. Therefore, the excess of the rotation speed of the rotary element over the given rotary-element rotating acceleration determining value can be more precisely predicted, than when the given rotary-element rotating acceleration determining value lies at a fixed level.

According to the fourth aspect of the present invention, when the rotation speed of the rotary element exceeds the given rotary-element rotation speed determining value, or the increment of the rotation speed per unit time of the rotary element exceeds the given rotary-element rotating acceleration determining value, the control device is operative to execute at least one of a drive control for driving the first electric motor so as to lower the rotation speed, a fuel supply stop control for stopping or limiting a fuel supply to the engine, and a fuel regulating-valve opening control for limiting an opening of a regulating valve for regulating amount of fuel being supplied to the engine.

Thus, this provides an increased effect of causing the limited differential action and rotational resistance of the engine to suppress an increase in rotation speed of the rotary element. As a result, degraded durability of the rotary element due to the high-speed rotation thereof can be minimized.

According to the fifth aspect of the present invention, the rotation speed per of the rotary element, present on the power transmitting path, is the relative rotation speed of the engaging members forming engaging elements provided in the hybrid vehicle drive apparatus. Accordingly, with the engaging element such as a clutch having the respective engaging members remaining rotatable, even if the relative rotation speed of such engaging members reaches a high-speed rotation, the control device causes the differential-action limiting device to limit the differential action of the differential mechanism. Such a limited differential action causes rotational resistance of the engine connected to the differential mechanism, to suppress an increase in the relative rotation speed of the engaging members. This results in an effect of suppressing degradation in durability of such an engaging element due to a high-speed rotation thereof.

According to the sixth aspect of the present invention, when the rotation speed of the second electric motor exceeds the given second-motor rotation speed determining value, the control device causes the differential-action limiting device to limit the differential action of the differential mechanism. Such a limited differential action causes rotational resistance of the engine connected to the differential mechanism, to suppress an increase in the rotation speed of the second electric motor connected to such a differential mechanism. This results in an effect of suppressing degradation in durability of the second electric motor due to a high-speed rotation thereof.

According to the seventh aspect of the present invention, when the increment of the rotation speed per unit time of the second electric motor exceeds the given second-motor rotating acceleration determining value, the control device causes the differential-action limiting device to limit the differential action of the differential mechanism.

That is, when the excess of the rotation speed of the second electric motor over the given second-motor rotation speed determining value is predicted based on a variation in the rotation speed, even if the rotation speed of the second electric motor does not exceed the given second-motor rotation speed determining value, the control device causes the differential-action limiting device to limit the differential action of the differential mechanism. Such a limited differential action causes rotational resistance of the engine, connected to the differential mechanism, to suppress an increase in the rotation speed of the second electric motor connected to the differential mechanism. This results in an effect of suppressing degradation in durability of the second electric motor due to a high-speed rotation thereof.

According to the eighth aspect of the present invention, the second-motor rotating acceleration determining value is determined depending on the rotation speed of the second electric motor. Thus, the excess of the second-motor rotation speed over the second-motor rotating acceleration determining value can be predicted more precisely than when the second-motor rotating acceleration determining value lies at a fixed level.

According to the ninth aspect of the present invention, when the rotation speed of the second electric motor exceeds the given second-motor rotation speed determining value, or the increment of the rotation speed per unit time of the second motor exceeds the given second-motor rotating acceleration determining value, the control device is operative to execute at least one of a drive control for driving the first electric motor so as to lower the rotation speed, a fuel supply stop control for stopping or limiting a supply of fuel to the engine, and a fuel regulating-valve opening control for limiting an opening of a regulating valve for regulating the amount of fuel being supplied to the engine.

Thus, this provides an increased effect of causing the limited differential action and rotational resistance of the engine to suppress an increase in rotation speed of the second electric motor. This results in an effect of suppressing degradation in durability of the second electric motor due to the high-speed rotation thereof.

According to the tenth aspect of the present invention, when the absolute value of the rotation speed of the rotary element incorporated in the planetary gear unit included in the differential mechanism, exceeds the given planetary-gear-unit rotation speed determining value, the control device causes the differential-action limiting device to limit the differential action of the differential mechanism. Such a limited differential action suppresses an increase in rotation speed of the rotary element incorporated in the planetary gear unit, thereby minimizing degradation in durability of such a rotary element due to a high-speed rotation thereof.

According to the eleventh aspect of the present invention, when the increment of the absolute value per unit time of the rotation speed of the rotary element incorporated in the planetary gear unit included in the differential mechanism, exceeds the given planetary-gear-unit rotating acceleration determining value, the control device causes the differential-action limiting device to limit the differential action of the differential mechanism.

That is, when the excess of the absolute value of the rotation speed of the rotary element incorporated in the planetary gear unit over the given planetary-gear-unit rotating acceleration determining value is predicted based on a variation in the rotation speed, even if the rotation speed of the rotary element incorporated in the planetary gear unit does not exceed the given planetary-gear-unit rotating acceleration determining value, the control device causes the differential-action limiting device to limit the differential action of the differential mechanism. Such a limited differential action suppresses an increase in the rotation speed of such a rotary element, thereby minimizing degradation in durability of the rotary element due to a high-speed rotation thereof.

According to the twelfth aspect of the present invention, the planetary-gear-unit rotating acceleration determining value is determined depending on the absolute value of the rotation speed of the rotary element incorporated in the planetary gear unit. Thus, the excess of the absolute value of the rotation speed of the rotary element over the planetary-gear-unit rotating acceleration determining value can be predicted more precisely than when the planetary-gear-unit rotating acceleration determining value lies at a fixed level.

According to the thirteenth aspect of the present invention, when the absolute value of the rotation speed of the rotary element incorporated in the planetary gear unit exceeds the planetary-gear-unit rotation speed determining value, or the increment of the absolute value of the rotation speed per unit time of the rotary element incorporated in the planetary gear unit exceeds the planetary-gear-unit rotating acceleration determining value, the control device is operative to execute at least one of a drive control for driving the first electric motor so as to lower the rotation speed, a fuel supply stop control for stopping or limiting a supply of fuel to the engine, and a fuel regulating-valve opening control for limiting an opening of a regulating valve for regulating the amount of fuel being supplied to the engine.

Thus, this provides an increased effect of causing the limited differential action and rotational resistance of the engine to suppress an increase in rotation speed of the rotary element incorporated in the planetary gear unit. As a result, degraded durability of the rotary element due to the high-speed rotation thereof can be minimized.

According to the fourteenth aspect of the present invention, the power interrupting portion is the engaging element incorporated in the mechanical shifting portion functioning as the transmission, which can interrupt the power transmitting path. Thus, interrupting the power transmitting path with the engaging element results in an effect of suppressing degradation in durability of the rotary element, present on the power transmitting path, the second electric motor or the rotary element of the planetary gear unit caused by the high-speed rotations thereof.

According to the fifteenth aspect of the present invention, the rotary element, present on the power transmitting path rotatably, is the rotary element incorporated in the planetary gear unit forming the mechanical shifting portion functioning as the transmission. This suppresses degradation in durability of the rotary element incorporated in the planetary gear unit due to the high-speed rotation thereof.

According to the sixteenth aspect of the present invention, the rotary element incorporated in the planetary gear unit provided in the differential mechanism or forming part of the mechanical shifting portion, is the planetary gears of the planetary gear unit. This suppresses degradation in durability of the planetary gears due to the high-speed rotations thereof.

According to the seventeenth aspect of the present invention, the differential mechanism includes a first rotary element connected to the engine in a drive-force transmissive state, a second rotary element connected to the second electric motor in a drive-force transmissive state, and a third rotary element connected to the power transmitting path extending to the drive wheels; and the differential-action limiting device is operative to suppress a relative rotation of at least two rotary elements among the first to third rotary elements for thereby limiting the differential action of the differential mechanism.

Therefore, when the differential action is limited, the first to third rotary elements are brought into a unitarily rotating or nearly unitarily rotating state. This allows rotational resistance of the engine connected to the first rotary element, to suppress an increase in rotation speed of the third rotary element connected to the power transmitting path extending to the drive wheels. This suppresses increases in rotation speeds of the rotary members such as the rotary element present on the power transmitting path, the second electric motor and the rotary element incorporated in the planetary gear unit of the differential mechanism. This results in an effect of suppressing degradation in durability of the rotary member due to a high-speed rotation thereof.

According to the eighteenth aspect of the present invention, the electrically controlled differential portion operates as the continuously variable transmission with controlling the operating state of the first electric motor. Thus, the drive torque output from the electrically controlled differential portion can be smoothly varied. In addition, the electrically controlled differential portion has not only a function to act as the continuously variable transmission with controlling the operating state of the first electric motor, but also a function to act as the step-variable transmission with varying the speed ratio step-by-step.

BRIEF DESCRIPTION OF THE DRAWINGS

FIG. 13 is a flowchart illustrating a basic sequence of major control operations to be executed with the electronic control device shown in FIG. 6, i.e., control operations for preventing a differential-portion planetary gear from reaching a high-speed rotation, which shows another embodiment corresponding to that shown in FIG. 11.

BEST MODE FOR CARRYING OUT THE INVENTION

Now, various embodiments of the present invention will be described below in detail with reference to accompanying drawings.

Embodiment 1

Figures 1, 2:
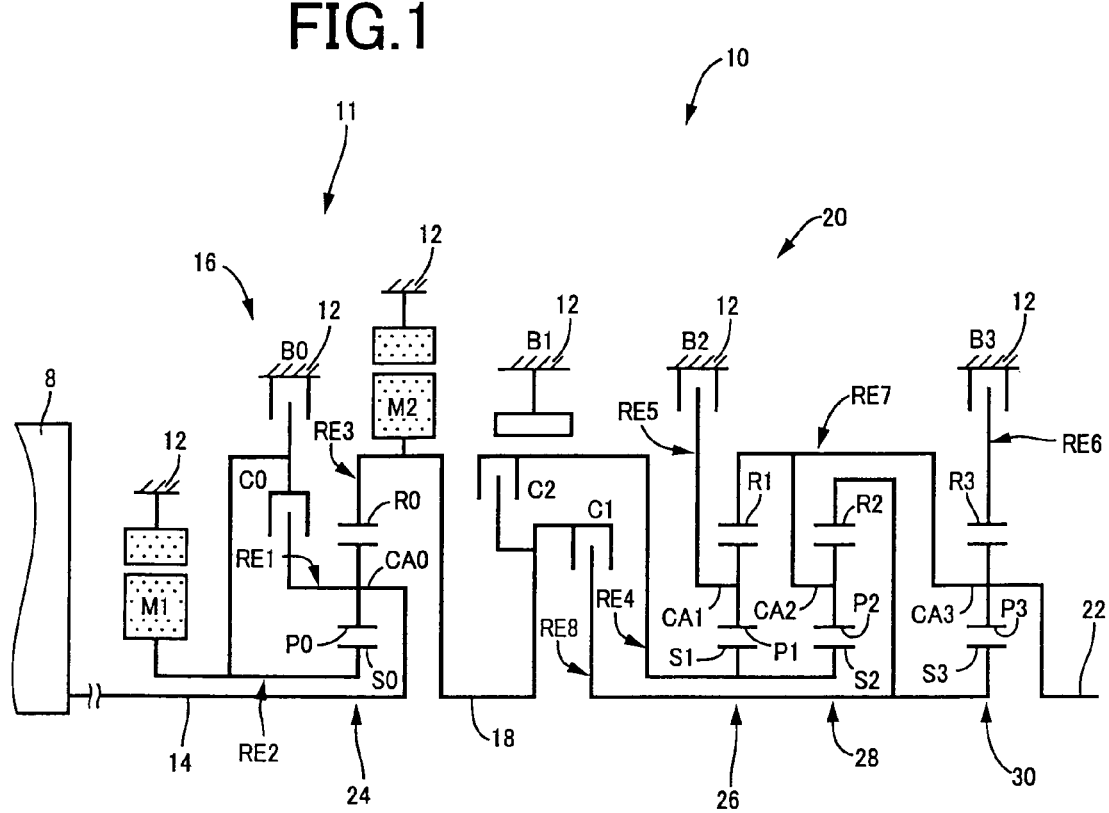
FIG. 1 is a skeleton view explaining a structure of a hybrid vehicle drive apparatus to which a control device of the present invention is applied.
FIG. 2 is an engagement operation table illustrating the relationship between a shifting operation, in which the hybrid vehicle drive apparatus, shown in FIG. 1, is placed in a continuously variable or step-variable shifting state, and the operation of a hydraulic-type frictional engaging device in combination.

FIG. 1 is a skeleton view illustrating a shifting mechanism 10, forming part of a drive apparatus for a hybrid vehicle, to which a control device of one embodiment according to the present invention is applied. As shown in FIG. 1, the shifting mechanism 10 includes an input shaft 14 serving as an input rotary member, a differential portion 11 directly connected to the input shaft 14 or indirectly connected thereto through a pulsation absorbing damper (vibration damping device) not shown, an automatic shifting portion 20 connected via a power transmitting member (transmission shaft) 18 in series through a power transmitting path between the differential mechanism 11 and drive wheels 38 (see FIG. 6) to serve as a step-variable type transmission, and an output shaft 22 connected to the automatic shifting portion 20 as an output rotary member, all of which are disposed in a transmission casing 12 (hereinafter briefly referred to as a "casing 12") serving as a non-rotary member connectedly mounted on a vehicle body.

Figure 6:
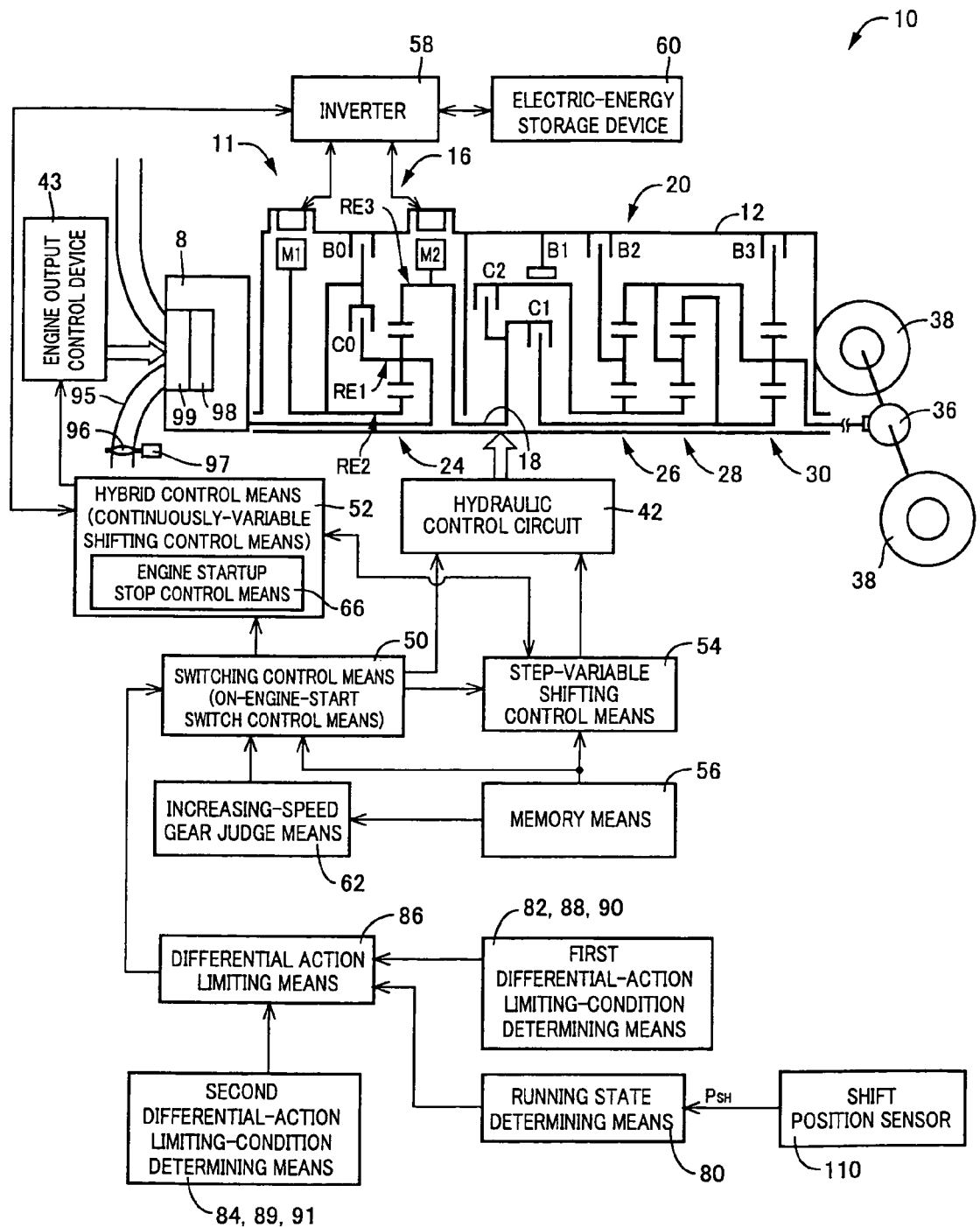
FIG. 6 is a functional block diagram illustrating a major control function to be executed by the electronic control device related to a first embodiment shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles.

With the shifting mechanism 10 of the present embodiment, the engine 8 and the differential portion 11 are connected to each other in a direct connection. As used herein, the term "direct connection" may refer to a connection, established without intervening any fluid-type transmitting device such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 can be said to be an electrically controlled differential portion in respect of an operation in which a differential state is altered using a first electric motor. The differential portion 11 includes a first electric motor M1, a power distributing mechanism 16 serving as a mechanical mechanism like a differential mechanism through which an output of the engine 8, inputted to the input shaft 14, is transferred to the first electric motor M1 and the power transmitting member 18, and a second electric motor M2 unitarily rotatable with the power transmitting member 18.

Further, the second electric motor M2 may be disposed at any portion of the power transmitting path extending from the power transmitting member 18 to the drive wheels 38. Moreover, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism of the present invention, mainly includes a differential-portion planetary gear unit 24 of a single pinion type having a given gear ratio ρ0 of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio ρ0 is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio γ0 (a ratio of rotation speed of the driving device input shaft 14 to the rotation speed of the power transmitting member 18) continuously varying in a value ranging from a minimum value γ0min to a maximum value γ0max.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio γ0 connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state.

Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio γ0 connected to a value smaller than "1", i.e., for example, about 0.7. In view of the operations set forth above, it can be said that the switching clutch C0, operative to unitarily couple the differential-portion sun gear S0 and the differential-portion carrier CA0 to each other, corresponds to a differential action limiting device of the present invention.

With the present embodiment, the switching clutch C0 and the switching brake B0 selectively place the shifting state of differential portion 11 (power distributing mechanism 16) in the differential state, i.e., the unlocked state and the non-differential state, i.e., the locked state. That is, the switching clutch C0 and the switching brake B0 serves as a differential state switching device that selectively switches the differential portion 11 (power distributing mechanism 16) in one of the continuously variable shifting state and the fixed shifting state.

The continuously variable shifting state is operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable. In the fixed shifting state, the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 which can be said as the mechanical shifting portion due to its shifting action by the mechanical operation, includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R0 meshing with the first sun gear S1 via the first planetary gears P1, having a gear ratio $\rho 1$ of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having for example a gear ratio $\rho 2$ of about "0.425".

The third planetary gear unit 30 includes a third sun gear S3, third planetary gears P3, a third carrier CA4 supporting the third planetary gears P3 to be rotatable about its axis and about the axis of the third sun gear S3, and the third ring gear R3 meshing with the third sun gear S3 through the third planetary gears P3, having a gear ratio $\rho 3$ of about "0.421". With the first sun gear S1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios $\rho 1$, $\rho 2$ and $\rho 3$ are represented by ZS1/ZR1, ZS2/ZR2, and ZS3/ZR3, respectively.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first differential-portion ring gear R0, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state.

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation Table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios $\gamma$ (input-shaft rotation speed $N_{IN}$/output-shaft rotation speed $N_{OUT}$) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state.

In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, when the shifting mechanism 10 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position.

Engaging the switching clutch C0, the first clutch C1 and the first brake B1 results in the 3rd-speed gear position with the speed ratio γ3 of, for instance, about "1.424", which is lower than that of the 2nd-speed gear position. Engaging the switching clutch C0, the first clutch C1 and the second clutch C2 results in the 4th-speed gear position with the speed ratio γ4 of, for instance, about "1.000", which is lower than that of the 3rd-speed gear position.

With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st- and 2nd-speed gear positions. For the neutral "N" state to be established, for instance, all the clutches and the brakes C0, C1, C2, B0, B1, B2 and B3 are disengaged. In addition, the clutches and the brakes C1, C2, B1, B2 and B3, incorporated in the automatic shifting portion 20, serve as clutch engaging elements for enabling the connection or disconnection of the power transmitting path from the differential portion 11 to the drive wheels 38. Accordingly, these component elements collectively correspond to power disconnecting means. Thus, it can be said that the automatic shifting portion 20 also functions as such power disconnecting means.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) γT.

Figure 3:
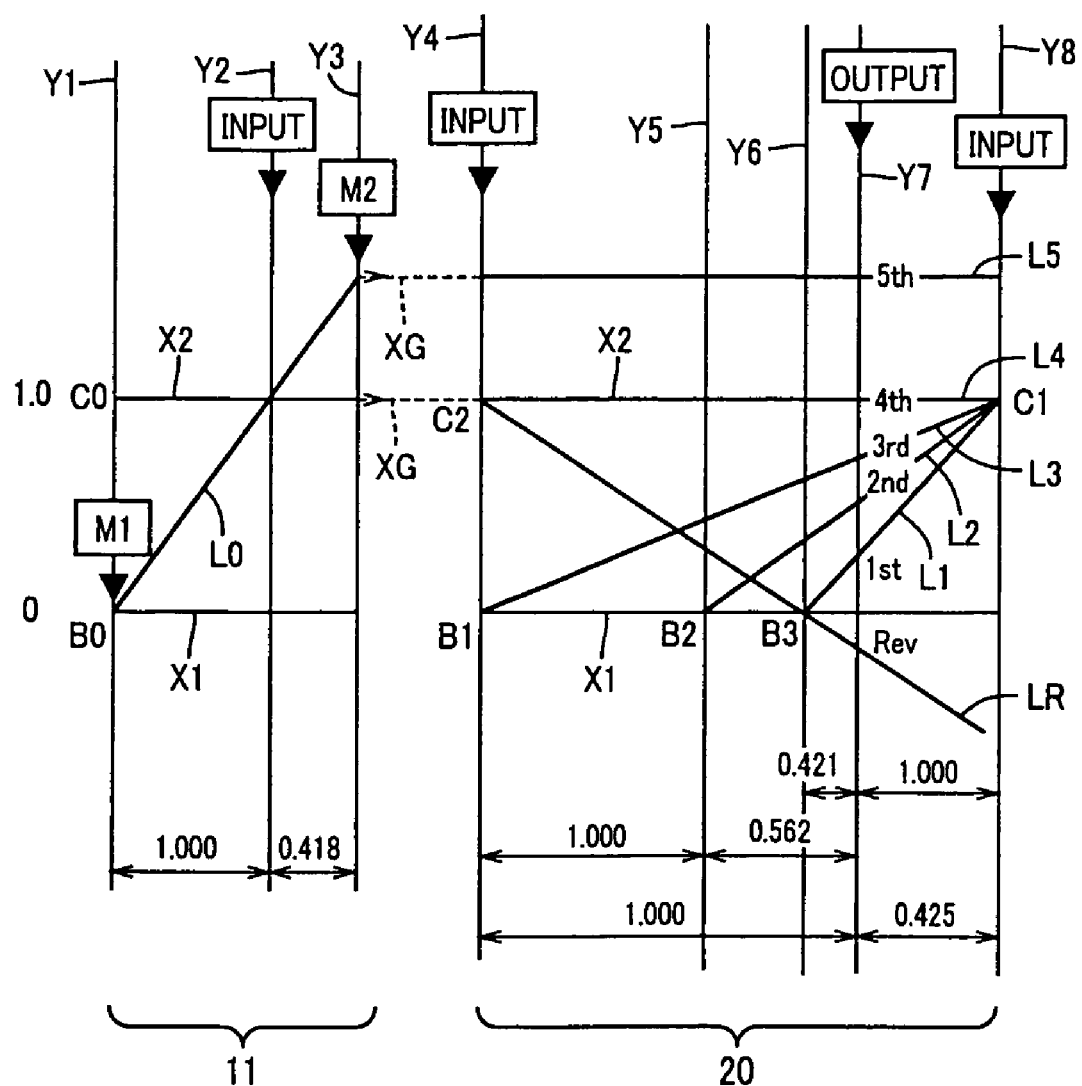
FIG. 3 is a collinear chart illustrating the relative rotation speed of rotary elements in each of different gear positions when the hybrid vehicle drive apparatus, shown in FIG. 1, is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios ρ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left, three vertical lines Y1, Y2 and Y3, corresponding to the three elements forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio ρ0 of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier corresponding to a fifth rotary element (fifth element) RE5, the third ring gear R3 corresponding to a sixth rotary element (sixth element) RE6, the first differential-portion ring gear R0 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios ρ1, ρ2 and ρ3 of the first to third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio ρ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "ρ". For each of the first to third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio ρ.

Expressing the structure using the collinear chart shown in FIG. 3, the shifting mechanism 10 of the present embodiment takes the form of a structure including the power distributing mechanism 16 (continuously variable shifting portion 11). With the power distributing mechanism 16, the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$.

In contrast, with the switching brake B0 being engaged to halt the rotation of the differential-portion sun gear S0, the power distributing mechanism 16 is brought into the non-differential state to function as the speed increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 11 to the eighth rotary element RE8 at a higher rotation speed than the engine rotation speed $N_E$. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
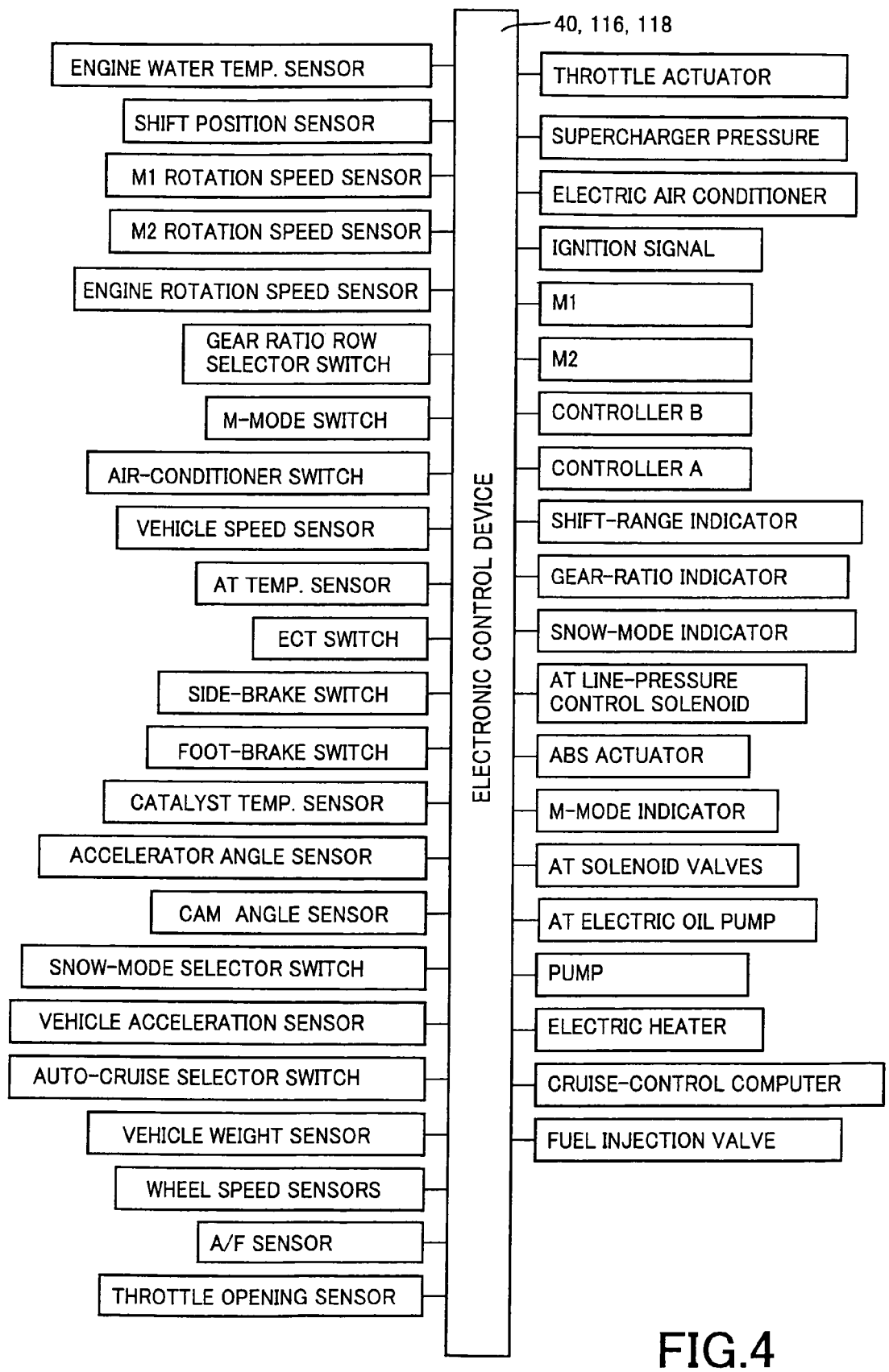
FIG. 4 is a view illustrating input and output signals to be input to or output from an electronic control device incorporated in the hybrid vehicle drive apparatus shown in FIG. 1.

FIG. 4 exemplarily shows various input signals applied to an electronic control device 40, serving as a control device for controlling the shifting mechanism 10 forming part of the hybrid vehicle drive apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the ROM, hybrid drive controls are conducted to control the engine 8 and the first and second electric motors M1 and M2, while executing drive controls such as shifting controls of the automatic shifting portion 20. Various determining means or controlling means shown in FIG. 6 are included in the electronic control device 40, as will be explained later.

The electronic control device 40 is applied with the various input signals from various sensors and switches shown in FIG. 4. These input signals include a signal indicative of an engine cooling water temperature $TEMP_W$, a signal indicative of a selected shift position $P_{SH}$, a signal indicative of a rotation speed $N_{M1}$ (hereinafter, referred to as a "first-motor rotation speed $N_{M1}$") of the first electric motor M1, a signal indicative of a rotation speed $N_{M2}$ (hereinafter, referred to as a "second-motor rotation speed $N_{M2}$") of the second electric motor M2, a signal indicative of the engine rotation speed $N_E$ representing the rotation speed of the engine 8, a signal indicative of a set value of gear ratio row, a signal commanding an "M" mode (manually shift drive mode), an air-conditioning signal indicative of the operation of an air conditioner, etc., a signal indicative of the vehicle speed V corresponding to the rotation speed $N_{OUT}$ of the output shaft 22, and a working oil temperature signal indicative of a working oil temperature of the automatic shifting portion 20.

Besides the input signals described above, the electronic control device 40 is further applied with other various input signals. These input signals include a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, a signal indicative of an air-fuel ratio A/F of the engine 8, and a signal indicative of a throttle valve opening $\theta_{TH}$, etc.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, command signals for commanding the operations of the first and second electric motors M1 and M2, and commanding signals for commanding a controller A and a controller B.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating a hydraulic pressure pump serving as a hydraulic pressure source of the hydraulically operated control circuit 42, a signal for driving an electric heater, signals applied to a cruise-control computer, etc., and signal actuating a fuel injection device.

Figure 5:
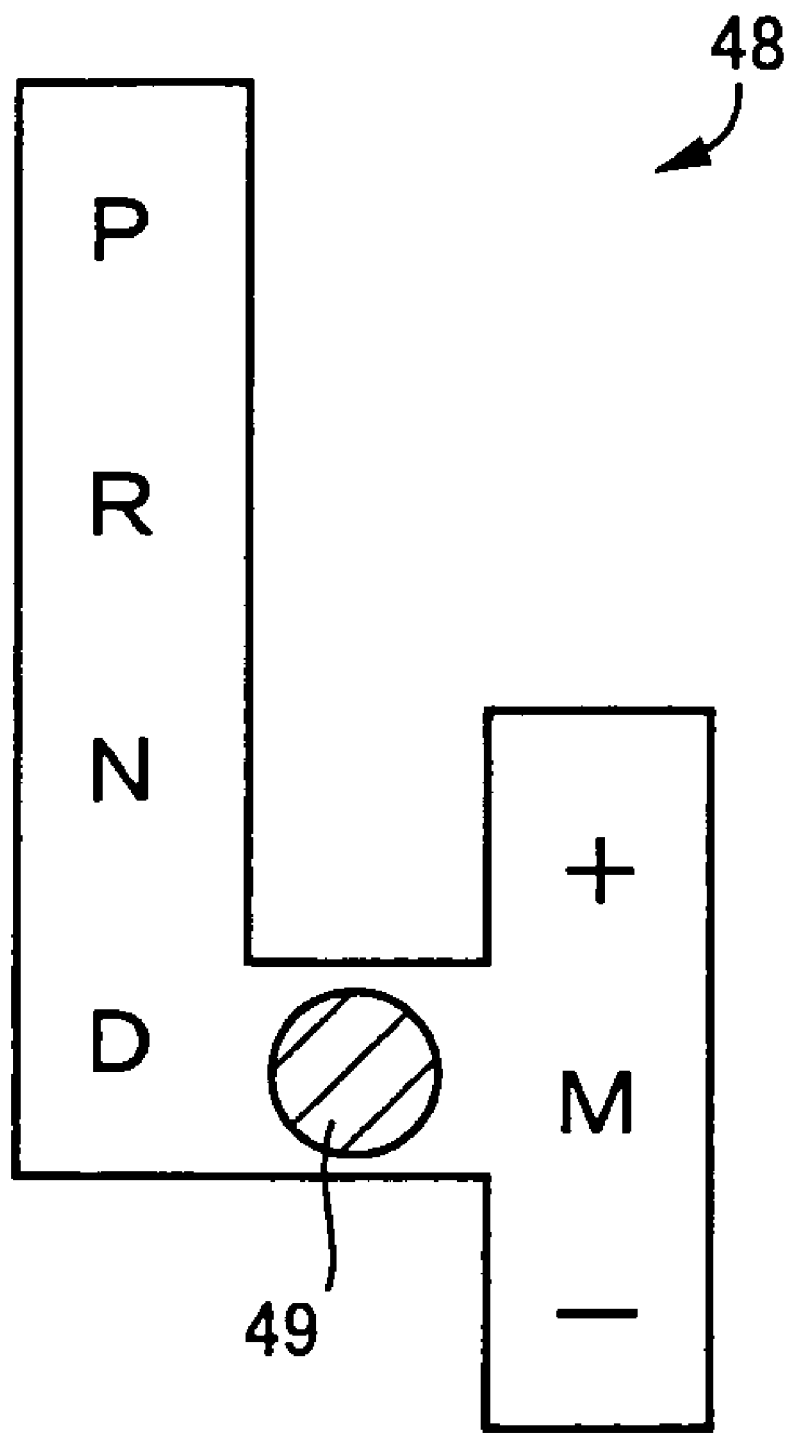
FIG. 5 is a view showing one sample of a shift operating device provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio γT that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions $P_{SH}$, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions $P_{SH}$ covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff i.e. interrupted state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for instance, the engagement operation table of FIG. 2. With such shifting positions selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state.

Figure 7:
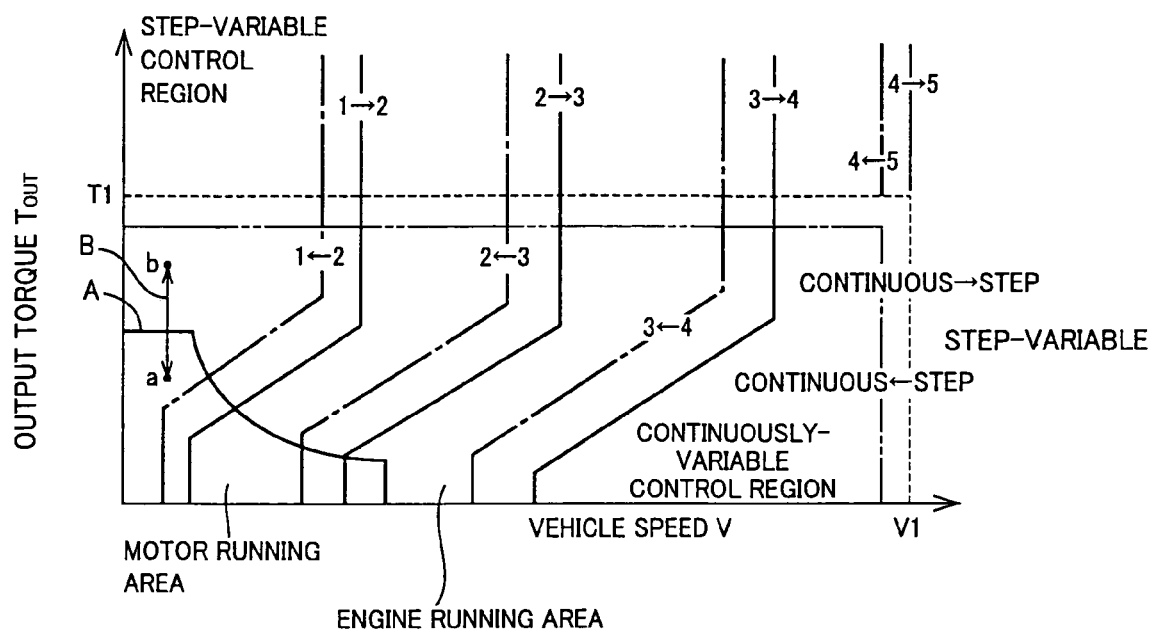
FIG. 7 is a view representing one example of a preliminarily stored shifting diagram, plotted on a two-dimensional coordinate in terms of parameters including a vehicle speed and output torque, based on which the operation is executed whether to a shifting is executed in an automatic shifting portion; one example of preliminarily stored diagram, based on which a shifting state of the shifting mechanism is switched; and one example of a preliminarily stored drive-force source switching diagram having a boundary line between an engine drive region and a motor drive region based on which an engine drive mode and a motor drive mode is switched.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7.

That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulically operated frictional engaging devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio $\gamma 0$ of the differential portion 11 placed in the electrically controlled continuously variable transmission.

For instance, during the vehicle running at a current vehicle speed, the hybrid control means 52 calculates a target (demanded) output of the vehicle by referring to the displacement value Acc of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed $N_E$ and engine torque $T_E$ such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed $N_E$, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationship) of the engine 8 preliminarily determined on an experimental basis such that, during the vehicle running under the continuously variable shifting state, the vehicle has drivability and fuel economy performance in compatibility on a two-dimensional coordinate with parameters including, for instance, the engine rotation speed $N_E$ and output torque (engine torque) $T_E$ of the engine 8.

In order to cause the engine 8 to operate on such an optimum fuel economy curve, a target value on the total speed ratio $\gamma T$ of the shifting mechanism 10 is determined so as to obtain engine torque $T_E$ and the engine rotation speed $N_E$ for the demanded engine output to be generated so as to satisfy, for instance, the target output (total target output and demanded drive force). To achieve such a target value, the hybrid control means 52 controls the speed ratio $\gamma 0$ of the differential portion 11, while controlling the total speed ratio $\gamma T$ within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque $T_E$, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed $N_{M1}$ at a negative rotation speed, i.e., at an idling speed to maintain the engine rotation speed $N_E$ at a zeroed or nearly zeroed level, thereby minimizing a drag of the engine 8, remained under a halted state, for providing improved fuel economy.

The hybrid control means 52 includes engine-startup stop controlling means 66 that switches an operating state of the engine 8 between a drive state and a stop state to select one of the engine drive mode and the motor drive mode. As used herein, the term "switches" refers to an operation in which the engine 8 is started up or stopped in operation. With the hybrid control means 52 executed the operation based on the vehicle condition by referring to, for instance, the drive-force source switching diagram shown in FIG. 7 to determine that the motor drive mode and the engine drive mode need to be switched, the engine-startup stop controlling means 66 executes the operation to start up or stop the engine 8.

If the accelerator pedal is depressed in operation to cause an increase in demanded engine output torque $T_{OUT}$, the vehicle condition varies from the motor drive region to the engine drive region as shown by a transition in points "a"→"b" on a solid line B in FIG. 7. When this takes place, the engine-startup stop controlling means 66 turns on the first electric motor M1 to raise the first-motor rotation speed $N_{M1}$. That is, the first electric motor M1 is rendered operative to function as a starter. This allows the engine 8 to start up with an increase in the engine rotation speed $N_E$. During such operation, the engine-startup stop controlling means 66 causes the ignition device 99 to initiate an ignition at a given engine rotation speed $N_E'$, i.e., for instance, at an engine rotation speed $N_E$ enabling an autonomous rotation, after which the hybrid control means 52 switches the motor drive mode to the engine drive mode.

During such operation, the engine-startup stop controlling means 66 may cause the first-motor rotation speed $N_{M1}$ to immediately raise for increasing the engine rotation speed $N_E$ up to the given engine rotation speed $N_E'$. This can immediately avoid the occurrence of a resonating region from an engine rotating speed region remaining below an idling rotation speed $N_{EIDLE}$ that is well known, thereby suppressing the possibility of the engine 8 vibrating at startup thereof.

If the accelerator pedal is released with a decrease in demanded engine output torque $T_{OUT}$, the vehicle condition varies from the engine drive region to the motor drive region as shown by another transition in points "b"→"a" on the solid line B in FIG. 7. When this takes place, the engine-startup stop controlling means 66 causes the fuel injection device 98 to interrupt the supply of fuel to the engine 8. That is, a fuel cutoff operation is executed to stop the engine 8. In such a way, the hybrid control means 52 switches the engine drive mode to the motor drive mode. During such an operation, the engine-startup stop controlling means 66 may execute the operation to immediately lower the first-motor rotation speed $N_{M1}$ for immediately lowering the engine rotation speed $N_E$ to a zeroed or nearly zeroed level. This immediately avoids the engine 8 from entering the resonating region, thereby suppressing the possibility of the engine 8 vibrating at startup thereof.

In an alternative, the engine-startup stop controlling means 66 may execute the operation to stop the engine 8 upon executing an operation to lower the first-motor rotation speed $N_{M1}$ to decrease the engine rotation speed $N_E$ on a stage prior to the fuel cutoff operation being executed for effectuating the fuel cutoff operation at the given engine rotation speed $N_E'$.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from the collinear chart shown in FIG. 3, for instance, when raising the engine rotation speed $N_E$, the hybrid control means 52 executes the operation to maintain the second-motor rotation speed $N_{M2}$, bound with the vehicle speed V, at a nearly fixed level while raising the first-motor rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Switching control means 50 switches the engaging and/disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11). That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance; the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio $\gamma 0$, i.e., for instance, the speed ratio $\gamma 0$ equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio $\gamma 0$, i.e., for instance, the speed ratio $\gamma 0$ equal to "1".

Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56.

In this case, the step-variable shifting control means 54 performs the automatic shifting upon executing the operation excepting the operations to engage the switching clutch C0 and the switching brake B0 in the engagement operation table shown in FIG. 2. This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio $\gamma T$ in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque at a high output.

A hysteresis is provided for determining the step-variable control region and the continuously variable control region as indicated by a double dot line in FIG. 7 in contrast to the broken line. That is, FIG. 7 represents a shifting diagram (switching map and relationship), preliminarily stored in terms of the parameters including the vehicle speed V, including the determining vehicle speed V1 and determining output torque T1, and output torque $T_{OUT}$, based on which the switching control means 50 executes the determination on a region as to which of the step-variable control region and the continuously variable control region belongs to the shifting mechanism 10.

The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this casing, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the vehicle running to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$ or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the vehicle running at the high speed turns out a consequence of deterioration in fuel economy. The determining vehicle speed V1 is determined to a value that can render the shifting mechanism 10 operative in the step-variable shifting state during the vehicle running at the high speed so as to address such an issue. Further, determining torque T1 is determined to a value that prevents reactive torque of the first electric motor M1 from covering a high output region of the engine during the vehicle running at a high output. That is, determining torque T1 is determined to such a value depending on, for instance, a characteristic of the first electric motor M1 that is possibly mounted with a reduced maximum output in electric energy for miniaturizing the first electric motor M1.

Figure 8:
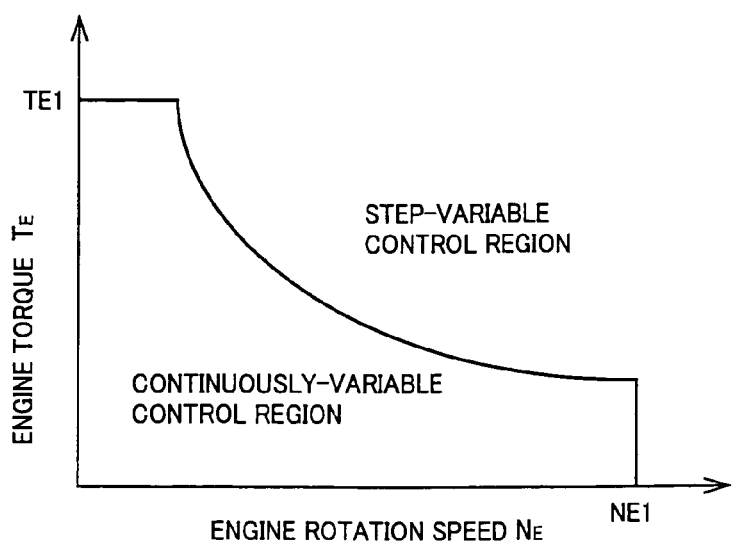
FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 8 in place of the switching diagram shown in FIG. 7. That is, the switching control means 50 may determine whether the vehicle condition, represented with the engine rotation speed $N_E$ and engine torque $T_E$, lies in the step-variable control region or the continuously variable control region.

Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

Figure 9:
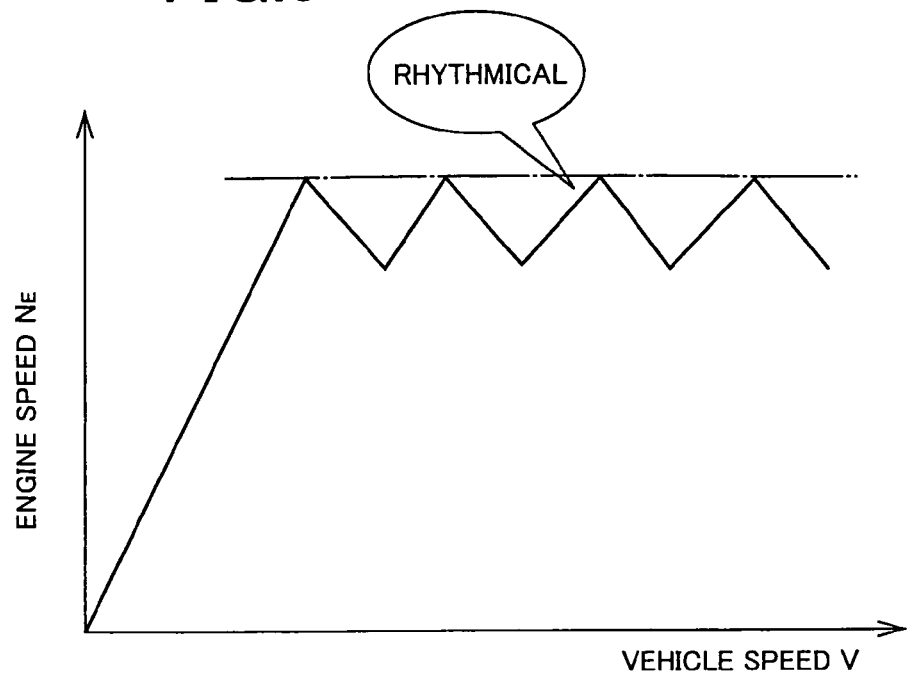
FIG. 9 is a graph showing a fluctuation in an engine rotation speed with an upshift effectuated in a step-variable transmission.

As indicated by the relationship shown in FIG. 8, similarly, the step-variable control region is set to lie in a high-torque region with engine torque $T_E$ exceeding a predetermined given value TE1, a high-speed rotating region with the engine rotation speed $N_E$ exceeding a predetermined given value NE1, or a high output region where the engine output calculated, based on engine torque $T_E$ and the engine rotation speed $N_E$, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 9, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the vehicle running at a low/medium speed and low/medium output, the shifting mechanism 10 is placed in the continuously variable shifting state to ensure the vehicle to have improved fuel economy performance. During the vehicle running at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 is caused to act as the electrically controlled continuously variable transmission, providing improved fuel consumption.

During the vehicle running on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle drive apparatus including such a component part to be further miniaturized in structure.

According to another viewpoint, further, during the vehicle running on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode as shown, for instance, in FIG. 9.

In such a way, the differential portion 11 (shifting mechanism 10) of the present embodiment can be selectively switched to one of the continuously variable shifting state and the step-variable shifting state (fixed shifting state). The switching control means 50 executes the operation based on the vehicle condition to determine the shifting state to be switched in the differential portion 11, thereby causing the shifting state to be selectively switched to either one of the continuously variable shifting state and the step-variable shifting state. With the first embodiment, the engine startup and stop controlling means 66 operates to start up or stop the engine 8 such that the hybrid control means 52 can execute the operation based on the vehicle condition to switch the engine drive mode and the motor drive mode.

During the vehicle running, there have been likelihoods that the vehicle occupant operates the shift lever 49 into the "N" position or a failure occurs in the electromagnetic valve, incorporated in the hydraulic control circuit 42 for switching the hydraulic pressure to be supplied to the clutch or the brake of the automatic shifting portion 20. Then, the first and second clutches C1 and C2 are caused to disengage and the automatic shifting portion 20 is placed in a neutral state with a disconnection occurring in the power transmitting path extending from the second electric motor M2 to the drive wheels 38.

During the vehicle running, in contrast, if the vehicle occupant initiates a downshift to cause a rapid increase in the speed ratio γ of the automatic shifting portion 20, a rapid drop occurs in running load that acts on the power transmitting member 18, serving as the input shaft of the automatic shifting portion 20, in a direction to suppress an increase in rotation speed thereof. This results in a probability of causing a rapid increase in the rotation speed of the rotary members, such as the clutches C1 and C2 connected to the power transmitting member 18, the differential-portion planetary gears P0 and the second electric motor M2 connected to the power transmitting member 18 which consequently reach high-speed rotations with the occurrence of degraded durability.

Now, description will be made of a control to be executed for preventing the occurrence of a rapid increase in rotation speed of the rotary member such as the clutch so as to avoid the occurrence of a high-speed rotation of the rotary member.

Turning back to FIG. 6, running state determining means 80 is provided to execute the operation based on whether or not the shift position $P_{SH}$, detected with the shift position sensor 110, is placed in the forward drive position such as the "D" position or the "M" position for performing the forward drive, thereby determining whether or not the vehicle is under the running state. Here, even if the shift operating device 48 is shifted into the "N" position during the vehicle running with the automatic shifting portion 20 brought into the power cutoff state, the vehicle still remains under the running condition. Therefore, when the shift operating device 48 is shifted into the "N" position, if it is determined based on the vehicle speed V that the vehicle remains under the running condition, the running state determining means 80 makes a positive determination that the vehicle remains under the running condition. In addition, the running state determining means 80 may obtain information on the shift position $P_{SH}$ not from the shift position sensor 110 but from the step-variable shifting control means 54.

First differential-action limiting-condition determining means 82 determines whether or not a rotation speed of the rotatable rotary element, present on the power transmitting path extending from the power distributing mechanism 16 to the drive wheels 38 rotatably, reaches a high-speed rotation exceeding a given rotary-element rotation-speed determining value $LMT1_{EL}$. As used herein, the term "rotary element" refers to the clutch or the brake like, for instance, the first clutch C1 or the second clutch C2. As used herein, the term "given rotary-element rotation-speed determining value $LMT1_{EL}$" refers to a value of, for instance, 10000 rpm that is predetermined. The given rotary-element rotation-speed determining value $LMT1_{EL}$ is a rotation speed having a likelihood of causing the occurrence of degradation in durability of the rotary element if the rotary element rotates at a high speed beyond such a determining value.

Second differential-action limiting-condition determining means 84 determines whether or not two conditions (a) and (b), described below, are satisfied. The first condition (a) concerns if the rotation speed of the rotary element reaches a high-speed rotation that exceeds a given rotary-element rotating acceleration determining threshold value (hereinafter referred to as a "rotating acceleration determining threshold value") $LMT2_{EL}$ that is lower than the given rotary-element rotation-speed determining value $LMT1_{EL}$ of the rotary element mentioned above. As used herein, the term "rotary element" refers to the clutch or the brake like, for instance, the first clutch C1 or the second clutch C2. The given rotary-element rotating acceleration determining threshold value $LMT2_{EL}$ is set to a predetermined value of, for instance, 8000 rpm.

The second condition (b) concerns if a rotating acceleration, representing an increment of the rotation speed per unit time of the clutch or the brake, is involved in a rapid rotational increase that exceeds the given rotary-element rotating acceleration determining value $N1_{EL}$.

The second differential-action limiting-condition determining means 84 makes a positive determination if both of the two conditions (a) and (b) are satisfied while making a negative determination if either one of the two conditions (a) and (b) is unsatisfied. Here, the rotating acceleration determining threshold value $LMT2_{EL}$ and the rotary-element rotating acceleration determining value $N1_{EL}$ represent determining values based on which if the rotation speed of the rotary element exceeds such determining values, it is predicted that the rotation speed of the clutch or the brake reaches a high-speed rotation that exceeds the rotary-element rotation-speed determining value $LMT1_{EL}$.

Figure 10:
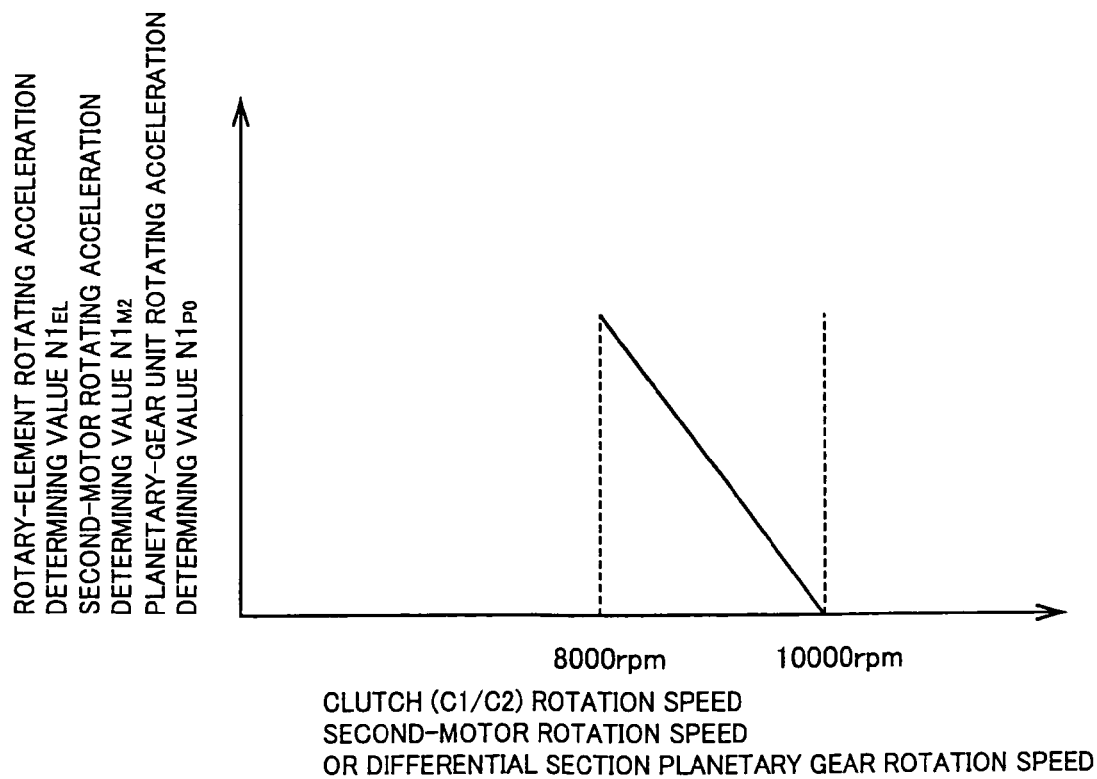
FIG. 10 is a graph based on which the electronic control device, shown in FIG. 4, determines a rotary-element rotating acceleration determining value $N1_{EL}$, a second-motor rotating acceleration determining value $N1_{M2}$ or a planetary-gear-unit rotating acceleration determining value $N1_{P0}$ on the basis of a rotation speed of a clutch or a brake, a second-motor rotation speed $N_{M2}$ or a differential-portion planetary-gear rotation speed $N_{P0}$.

The rotary-element rotating acceleration determining value $N1_{EL}$ may lay at a fixed value. In an alternative, as shown in FIG. 10, the rotary-element rotating acceleration determining value $N1_{EL}$ may be determined so as to vary depending on the rotation speed of the rotary element such that the higher the rotation speed of the clutch or the brake like the first clutch C1 or the second clutch C2, the lower will be the rotary-element rotating acceleration determining value $N1_{EL}$.

In determining operations of the first differential-action limiting-condition determining means 82 and the second differential-action limiting-condition determining means 84, the clutch or the brake may incorporate a rotation speed sensor for detecting the rotation speed of such a rotary element. In another alternative, the rotation speed of the clutch or the brake may be calculated based on the rotation speed of the input shaft (power transmitting member 18) or the output shaft 22 of the automatic shifting portion 20 and the speed ratio of the automatic shifting portion 20.

Since each of respective clutch-engaging members forming, for instance, the first clutch C1 and the second clutch C2 is rotatable, the rotation speed of the clutch or the brake may be regarded to be a relative rotation speed between rotation speeds of the clutch-engaging members forming such rotary elements. Further, among the rotation speeds of the rotary elements present on the power transmitting path described above, a rotation speed of the rotary element, deemed to have the possibility of reaching the highest rotation speed, may be regarded to be the rotation speed of the clutch or the brake.

If the first differential-action limiting-condition determining means 82 or the second differential-action limiting-condition determining means 84 makes a positive determination, the running state determining means 80 makes a positive determination. When this takes place, the differential action limiting means 86 allows the switching clutch C0 to engage.

This causes the switching control means 50 to execute the C0-lock control for suppressing the relative rotation between the first and second rotary elements RE1 and RE2 to limit the differential action of the power distributing mechanism 16.

As will be understood from the collinear chart shown in FIG. 3, with the C0-lock control executed, the switching clutch C0 is caused to engage placing the differential portion 11 in the non-differential or nearly non-differential state with the first to third rotary elements RE1 to RE3 brought into a unitary rotation. Thus, the engine 8 (RE1), the first electric motors (RE2) and the second electric motors (RE3) are caused to rotate at an identical or nearly identical speed. In addition, the C0-lock control is executed because of applying the power transmitting member 18 acting as the input shaft of the automatic shifting portion 20 with a rotational load for thereby preventing the clutch or the brake from reaching the high-speed rotation. Therefore, no need necessarily arises for the switching clutch C0 to remain under a completely engaged condition during the execution of the C0-lock control and the switching clutch C0 may remain under a half-engaged (slipping) state.

Figure 11:
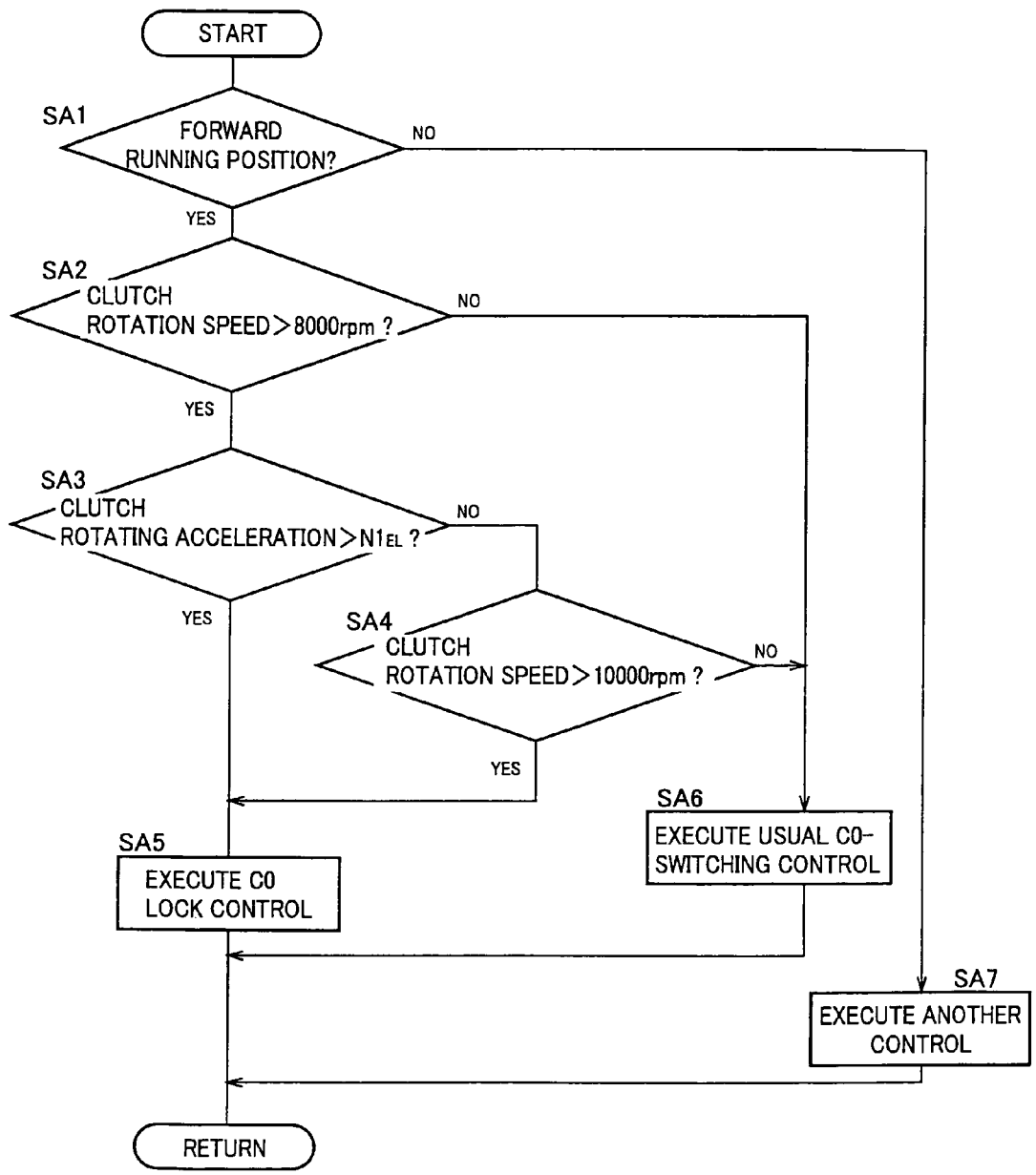
FIG. 11 is a flowchart illustrating a basic sequence of major control operations to be executed with the electronic control device shown in FIG. 6, i.e., control operations for preventing a clutch, etc., of the automatic shifting portion from reaching a high-speed rotation.

FIG. 11 is a flowchart illustrating a basic sequence of major control operations to be executed with the electronic control device 40, i.e., control operations to be executed when preventing the clutch, etc., of the automatic shifting portion 20 from reaching a high-speed rotation. This sequence is repeatedly executed on an extremely short cycle in the order of, for instance, several milliseconds or several tens milliseconds.

First, in step (which will be hereinafter omitted) SA1 corresponding to the running state determining means 80, the operation is executed to determine whether or not the vehicle is under the forward running state. In particular, the running state determining means 80 executes the operation to find if the shift position $P_{SH}$ is placed in the forward drive position such as the "D" or "M" positions, thereby determining whether or not the vehicle is under the running state. Here, the vehicle is regarded to remain under the running condition even if the shift operating device 46 is shifted into the "N" position during the vehicle running with the automatic shifting portion 20 placed in the power cutoff state. Therefore, even when the shift operating device 46 is shifted into the "N" position, if a determination is made based on the vehicle speed V that the vehicle is under the running condition, the running state determining means 80 makes a positive determination that the vehicle remains under the running condition. If the positive determination is made in SA1, then, the operation goes to SA2. If a negative determination is made in SA1, then, the operation goes to SA7.

In SA2, the operation is executed to determine whether or not one condition (a) is satisfied. That is, this condition (a) concerns if the rotation speed of the rotary element, present on the power transmitting path extending from the power distributing mechanism 16 to the drive wheels 38, reaches a high-speed rotation that exceeds the rotating acceleration determining threshold value $LMT2_{EL}$. As used herein, the term "rotary element" refers to the clutch or the brake such as, for instance, the first clutch C1 or the second clutch C2. If a positive determination is made in SA2, then, the operation goes to SA3 and if a negative determination is made in SA2, then, the operation goes to SA6.

In SA3, the operation is executed to determine whether or not the other condition (b) is satisfied. That is, this condition (b) concerns if the rotation speed of the rotary element, present on the power transmitting path extending from the power distributing mechanism 16 to the drive wheels 38, is involved in a rapid increase in rotation that exceeds the rotary-element rotating acceleration determining value $N1_{EL}$. If a positive determination is made in SA3, then, the operation goes to SA5 and if a negative determination is made in SA3, then, the operation goes to SA4. In this respect, SA2 and SA3 collectively correspond to the second differential-action limiting-condition determining means 84.

In SA4 corresponding to the first differential-action limiting-condition determining means 82, the operation is executed to determine whether or not the rotation speed of the rotary element reaches a high-speed rotation that exceeds the rotary-element rotation-speed determining value $LMT1_{EL}$. As used herein, the term "rotary element" refers to the clutch or the brake such as, for instance, the first clutch C1 or the second clutch C2. If a positive determination is made in SA4, then, the operation goes to SA5 and if a negative determination is made in SA4, then, the operation goes to SA6.

In SA5 corresponding to the differential action limiting means 86, the C0-lock control is executed.

In SA6, a usual C0-switching control is executed intact for a normal running mode with no need for executing the C0-lock control.

With the determination made in SA1 that the vehicle does not remain under the running condition, the other control is executed in SA7 to perform, for instance, an operation to stop the engine 8.

The electronic control device 40 of the first embodiment has various advantageous effects (A1) to (A7) as listed below.

(A1) When the rotation speed of the rotary element, such as the first clutch C1 or the second clutch C2, reaches the high-speed rotation exceeding the rotary-element rotation-speed determining value $LMT1_{EL}$, the C0-lock control is executed. This allows the differential action to be limited, causing rotational resistance of the engine 8, connected to the power distributing mechanism 6, to suppress an increase in rotation speed of the rotary element present on the power transmitting path connected to the power distributing mechanism 16. This minimizes degradation in durability of the rotary element caused by the high-speed rotation thereof.

(A2) When the rotation speed of the rotary element exceeds the rotary-element rotating acceleration determining value $N1_{EL}$ lower than the rotary-element rotation-speed determining value $LMT1_{EL}$, if the rotating acceleration, representing an increment of the rotation speed per unit time, of the rotary element exceeds the rotary-element rotating acceleration determining value $N1_{EL}$, the C0-lock control is executed. Therefore, even if the rotation speed of the rotary element does not exceeds the rotary-element rotation-speed determining value $LMT1_{EL}$, the C0-lock control is executed in the presence of a prediction made on the basis of a variation in the rotation speed that the rotation speed of the rotary element will exceed the rotary-element rotation-speed determining value $LMT1_{EL}$. This causes the differential action to be limited, causing rotational resistance of the engine 8, connected to the power distributing mechanism 16, to suppress an increase in rotation speed of the rotary element present on the power transmitting path connected to the power distributing mechanism 16. This suppresses the occurrence of degradation in durability of the rotary element due to the high-speed rotation thereof.

(A3) As shown in FIG. 10, the rotary-element rotating acceleration determining value $N1_{EL}$ may be determined so as to vary depending on the rotation speed of the rotary element, such as the first clutch C1 or the second clutch C2, such that the higher the rotation speed of the rotary element, the less will be the rotary-element rotating acceleration determining value $N1_{EL}$. With the rotary-element rotating acceleration determining value $N1_{EL}$ determined to be variable in such a way, the operation can be executed to more precisely predict if the rotation speed of the rotary element exceeds the rotary-element rotation-speed determining value $LMT1_{EL}$ than that predicted when the rotary-element rotating acceleration determining value $N1_{EL}$ is kept at a fixed level.

(A4) The rotation speed of the rotary element may be assigned to be the relative rotation speed of the clutch-engaging members forming the engaging elements such as the first clutch C1 or the second clutch C2. If the relative rotation speed of the clutch-engaging members reaches a high level, then, the C0-lock control is executed. This allows the differential action to be limited, causing rotational resistance of the engine 8, connected to the power distributing mechanism 16, to suppress an increase in relative rotation speed of the clutch-engaging members forming the engaging elements of the automatic shifting portion 20 connected to the power distributing mechanism 16. This suppresses the occurrence of degradation in durability of the clutch-engaging elements caused by a high-speed rotation thereof.

(A5) With the C0-lock control being executed, the differential portion 11 is placed in the non-differential or nearly non-differential state with the first to third rotary elements RE1 to RE3 brought into a unitary rotation. This results in a capability of causing rotational resistance of the engine 8, connected to the power distributing mechanism 16, to minimize an increase in rotation speed of the third rotary element RE3 connected to the power transmitting path to which the drive wheels 38 are connected.

Such an operation minimizes an increase in rotation speed of the rotary element such as the first clutch C1 or the second clutch C2, present on the power transmitting path connected to the third rotary element RE3, thereby suppressing the occurrence of degradation in durability of the rotary element due to the high-speed rotation thereof. As the C0-lock control is executed, the differential portion 11 is placed in the non-differential or nearly non-differential state with the first to third rotary elements RE1 to RE3 brought into the unitary rotation. Therefore, effectuating the fuel cutoff operation to limit an increase in engine rotation speed $N_E$ results in a consequence of limiting the rotation speed of the rotary element to a level lower than a value identical to or nearly identical to the engine rotation speed $N_E$.

(A6) The automatic shifting portion 20 and the differential portion 11, operative to act as the continuously variable transmission with controlling the operating state of the first electric motor, constitute the continuously variable transmission, smoothly varying the drive torque. In addition, the differential portion 11 has not only a function to act as the electrically controlled continuously variable transmission with continuously varying the speed ratio but also a function to act as the step-variable transmission with varying the speed ratio step-by-step.

(A7) Either one of the clutches C1 and C2 or the brakes B1 to B3, incorporated in the automatic shifting portion 20, is rendered operative to function as a power interrupting section during the vehicle running for interrupting the power transmitting path extending from the power distributing mechanism 16 (differential portion 11) to the drive wheels 38, thereby interrupting the power transmitting path. In such a case, executing the C0-lock control based on the control mode shown in FIG. 11 suppresses the occurrence of degradation in durability of the rotary element, present on the power transmitting path, due to the high-speed rotation thereof.

Next, another embodiment of the present invention will be described below. Also, component parts common to various embodiments bear like reference numerals to omit redundant description.

Embodiment 2

A second embodiment takes the form of a structure in which the electronic control device 40, shown in FIG. 4, is replaced by an electronic control device 116. FIG. 6 is the functional block diagram for illustrating a major part of control functions to be executed by the electronic control device 116 of the second embodiment. In FIG. 6, the running state determining means 80 and the differential-action limiting means 86 are commonly incorporated in the first and second embodiments. The second embodiment takes the form of a structure wherein the first differential-action limiting-condition determining means 82 and the second differential-action limiting-condition determining means 84 of the first embodiment are replaced by first differential-action limiting-condition determining means 88 and second differential-action limiting-condition determining means 89, respectively. Hereunder, description will be made of the second embodiment with a focus on points different from the first embodiment.

The first differential-action limiting-condition determining means 88 determines whether or not a rotation speed $N_{M2}$ of the second electric motor M2 reaches a high-speed rotation exceeding a given second-motor rotation-speed determining value (hereinafter referred to as "rotation-speed determining value") $LMT1_{M2}$, i.e., a predetermined value of, for instance, 10000 rpm. As used herein, the term "rotation-speed determining value $LMT1_{M2}$" refers to a rotation speed having a likelihood of degradation occurring in durability of the second electric motor M2 if the rotation excess of the second electric motor M2 reaches a high-speed rotation at a level beyond such a determining value.

The second differential-action limiting-condition determining means 89 determines whether or not two conditions (a) and (b), described below, are satisfied. The first condition (a) concerns if the rotation speed $N_{M2}$ of the second electric motor M2 reaches a given second-motor rotating acceleration determining threshold value (hereinafter referred to as "rotating acceleration determining threshold value") $LMT2_{M2}$, i.e., a predetermined value of, for instance, 8000 rpm lower than the high-speed rotation exceeding a given second-motor rotation-speed determining value $LMT1_{M2}$. The second condition (b) concerns if a rotating acceleration, representing an increment of the second-motor rotation speed $N_{M2}$ per unit time, is a rapid increase in rotation that exceeds a given second-motor rotating acceleration determining value $N1_{M2}$.

The second differential-action limiting-condition determining means 89 makes a positive determination if both the two condition (a) and (b) are satisfied, while making a negative determination if either one of the two conditions (a) and (b) is unsatisfied. As used herein, the terms "rotating acceleration determining threshold value $LMT2_{M2}$" and "second-motor rotating acceleration determining value $N1_{M2}$" refer to determining values based on which if the rotation speed and the rotating acceleration of the second electric motor exceed such determining values, then, it is predicted that the second-motor rotation speed $N_{M2}$ reaches a high-speed rotation exceeding the rotation-speed determining value $LMT1_{M2}$.

The second-motor rotating acceleration determining value $N1_{M2}$ may take a fixed value. In an alternative, as shown in FIG. 10, the second-motor rotating acceleration determining value $N1_{M2}$ may be determined so as to vary such that the higher the second-motor rotation speed $N_{M2}$, the less will be the second-motor rotating acceleration determining value $N1_{M2}$. In addition, in determining operations of the first and second differential-action limiting-condition determining means 88 and 89, the second-motor rotation speed $N_{M2}$ may be detected using a rotation speed sensor incorporated in the second electric motor M2 or calculated based on the first-motor rotation speed $N_{M1}$ and the engine speed $N_E$.

If the first differential-action limiting-condition determining means 88 or the second differential-action limiting-condition determining means 89 makes a positive determination, the running state determining means 80 makes a positive determination. When this takes place, the differential action limiting means 86 causes the switching control means 50 to execute the C0-lock control. Since the C0-lock control is executed for preventing the second electric motor M2 from reaching a high-speed rotation, the switching clutch C0 is not necessarily placed in a completely engaged state but may be placed in a half-engaged (slipping) state.

Figure 12:
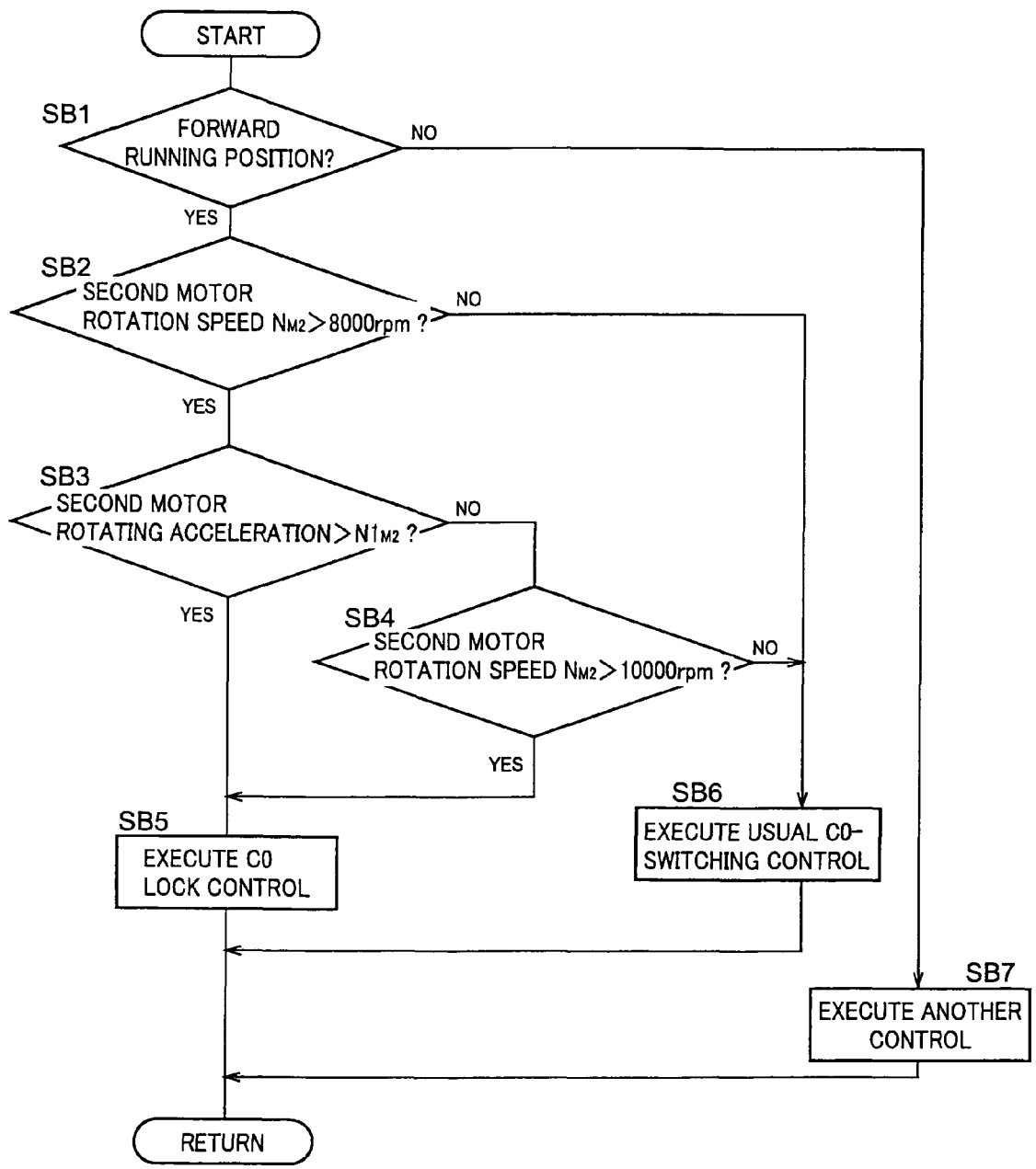
FIG. 12 is a flowchart, illustrating a basic sequence of major control operations to be executed with the electronic control device shown in FIG. 6, i.e., control operations for preventing a second electric motor from reaching a high-speed rotation, which shows another embodiment corresponding to that shown in FIG. 11.

FIG. 12 is a flowchart illustrating a basic sequence of major control operations to be executed with the electronic control device 116, i.e., control operations to be executed for preventing the second electric motor M2 from reaching a high-speed rotation. This sequence is repeatedly executed on an extremely short cycle in the order of, for instance, several milliseconds or several tens milliseconds. SB1 and SB5 to SB7, shown in FIG. 12 related to the second embodiment, correspond to steps SA1 and SA5 to SA7 of FIG. 11, respectively, which represent the first embodiment shown in FIG. 11. Hereunder, the control operations, shown in FIG. 12, will be described with a focus on points different from those of FIG. 11.

If the determination is made positive in SB1, then, the operation is executed in SB 2 to determine if the first condition (a) is satisfied, i.e., whether or not the second-motor rotation speed $N_{M2}$ reaches a high-speed rotation exceeding the rotating acceleration determining threshold value $LMT2_{M2}$. If the determination is made positive in SB2, then, the operation goes to SB 3 and if the determination is made negative in SB2, then, the operation goes to SB6.

In SB3, the operation is executed to determine if the other condition (b) is satisfied, i.e., whether or not the rotating acceleration, representing the increment of the second-motor rotation speed $N_{M2}$ per unit time, is involved in a rapid increase in rotation that exceeds the second-motor rotating acceleration determining value $N1_{M2}$. If a positive determination is made in SB3, then, the operation goes to SB5 and if a negative determination is made in SB3, then, the operation goes to SB4. In this respect, SB2 and SB3 collectively correspond to the second differential-action limiting-condition determining means 89.

In SB4 corresponding to the first differential-action limiting-condition determining means 88, the operation is executed to determine whether or not the second-motor rotation speed $N_{M2}$ reaches a high-speed rotation exceeding the second-motor rotation-speed determining value $LMT1_{M2}$. If a positive determination is made in SB4, then, the operation goes to SB5 and if a negative determination is made in SB4, then, the operation goes to SB6.

The electronic control device 116 of the second embodiment has various advantageous effects (B1) to (B5) as listed below.

(B1) When the second-motor rotation speed $N_{M2}$ reaches the high-speed rotation exceeding the rotation-speed determining value $LMT1_{M2}$, the C0-lock control is executed. This allows the differential action to be limited, causing rotational resistance of the engine 8, connected to the power distributing mechanism 6, to suppress an increase in rotation speed $N_{M2}$ of the second electric motor M2 connected to the third rotary element RE3. This minimizes a drop in durability of the second electric motor M2 caused by the high-speed rotation thereof.

(B2) When the second-motor rotation speed $N_{M2}$ exceeds the rotating acceleration determining threshold value $LMT2_{M2}$ lower than the rotary-element rotation-speed determining value $LMT1_{EL}$, if the rotating acceleration, representing the increment of the second-motor rotation speed $N_{M2}$ per unit time, exceeds the second-motor rotating acceleration determining value $N1_{M2}$, the C0-lock control is executed. Therefore, even if the second-motor rotation speed $N_{M2}$ does not exceed the rotation-speed determining value $LMT1_{M2}$, the C0-lock control is executed if the excess of the second-motor rotation speed $N_{M2}$ over the rotation-speed determining value $LMT1_{M2}$ is predicted based on a variation in the second-motor rotation speed $N_{M2}$. This allows the differential action to be limited, causing rotational resistance of the engine 8, connected to the power distributing mechanism 16, to prevent an increase in the second-motor rotation speed $N_{M2}$ of the second electric motor M2 connected to the third rotary element RE3. This suppresses degradation in durability of the second electric motor M2 due to the high-speed rotation thereof.

(B3) As shown in FIG. 10, the second-motor rotating acceleration determining value $N1_{M2}$ may be determined to vary depending on the second-motor rotation speed $N_{M2}$ such that the higher the second-motor rotation speed $N_{M2}$, the less will be the second-motor rotating acceleration determining value $N1_{M2}$. With the second-motor rotating acceleration determining value $N1_{M2}$ determined to be variable in such a way, the operation can be executed to more precisely predict if the second-motor rotation speed $N_{M2}$ exceeds the second-motor rotating acceleration determining value $N1_{M2}$ than that predicted when the second-motor rotating acceleration determining value $N1_{M2}$ is maintained at a fixed level.

(B4) With the C0-lock control being executed, the differential portion 11 is placed in the non-differential or nearly non-differential state with the first to third rotary elements RE1 to RE3 brought into a unitary rotation. This results in a capability of causing rotational resistance of the engine 8, connected to the first rotary element RE1, to minimize an increase in rotation speed of the third rotary element RE3. Then, this suppresses an increase in the rotation speed $N_{M2}$ of the second-motor M2 connected to the third rotary element RE3, thereby minimizing degradation in durability of the second-motor M2 caused by the high-speed rotation thereof.

When the C0-lock control being executed, the differential portion 11 is placed in the non-differential or nearly non-differential state with the first to third rotary elements RE1 to RE3 brought into the unitary rotation. Therefore, executing a fuel cutoff operation to limit an increase in the engine rotation speed $N_E$ results in a consequence of limiting the second-motor rotation speed $N_{M2}$ to a level lower than a value equal to or nearly equal to the engine rotation speed $N_E$.

(B5) Either one of the clutches C1 and C2 or the brakes B1 to B3, incorporated in the automatic shifting portion 20, is rendered operative to function as a power interrupting section during the vehicle running for interrupting the power transmitting path extending from the power distributing mechanism 16 (differential portion 11) to the drive wheels 38, thereby interrupting the power transmitting path. In such a case, executing the C0-lock control based on the control operations shown in FIG. 12 suppresses the occurrence of degraded durability resulting from the high-speed rotation of the second electric motor M2. In addition, since both of the first and second embodiments have the same structures with the same functions, the second embodiment has the same advantageous effect as the effect (A6) of the first embodiment.

Embodiment 3

A third embodiment takes the form of a structure in which the electronic control device 40, shown in FIG. 4, is replaced by an electronic control device 118. FIG. 6 also represents the functional block diagram for illustrating a major control function to be executed by the electronic control device 118 of the third embodiment. In FIG. 6, the running state determining means 80 and the differential-action limiting means 86 are commonly incorporated in the first and third embodiments. The third embodiment takes the form of a structure wherein the first differential-action limiting-condition determining means 82 and the second differential-action limiting-condition determining means 84 of the first embodiment are replaced by first differential-action limiting-condition determining means 90 and second differential-action limiting-condition determining means 91, respectively. Hereunder, description will be made of the third embodiment with a focus on points different from the first embodiment.

The first differential-action limiting-condition determining means 90 determines whether or not an absolute value of a rotation speed $N_{P0}$ of a differential-portion planetary gear P0, acting as a rotary element of the differential-portion planetary gear unit 24, reaches a given planetary-gear rotation speed determining value (hereinafter suitably referred to as "rotation speed determining value") $LMT1_{P0}$, i.e., a predetermined value of, for instance, 10000 rpm.

Here, the differential-portion rotation speed $N_{P0}$ can be calculated using a formula (1) expressed below upon yielding δ in a formula (2) expressed below. In formulae (1) and (2), $N_{CA0}$ represents a rotation speed of the differential-portion carrier CA0, i.e., the engine rotation speed $N_E$; $N_{S0}$ represents a rotation speed of the differential-portion sun gear S0, i.e., the first-motor rotation speed $N_{M1}$; $Z_{S0}$ represents the number of teeth of the differential-portion sun gear S0; and ZP0 represents the number of teeth of the differential-portion planetary gear P0. As used herein, the term "rotation speed determining value $LMT1_{P0}$" refers to a rotation speed with a likelihood of degradation occurring in the differential-portion planetary gear P0 when the rotation speed thereof exceeds such a rotation speed determining value.

$$N_{P0} = (1+\delta) \times N_{CA0} - \delta \times N_{S0} \quad (1)$$

$$\delta = ZS0/ZP0 \quad (2)$$

The second differential-action limiting-condition determining means 91 determines whether or not two conditions, described below, are satisfied. The first condition (a) concerns if the absolute value of the differential-portion planetary-gear rotation speed $N_{P0}$, calculated using the formula (1), reaches a high-speed rotation exceeding a given differential-portion planetary-gear rotating acceleration determining threshold value (hereinafter suitably referred to as "rotating acceleration determining threshold value") $LMT2_{P0}$, i.e., a predetermined value of, for instance, 8000 rpm lower than the rotation speed determining value $LMT1_{P0}$.

The second condition (b) concerns if a rotating acceleration, representing an increment of the differential-portion planetary-gear rotation speed $N_{P0}$ per unit time, is a rapid increase in rotation that exceeds a given planetary-gear rotating acceleration determining value (hereinafter suitably referred to as "rotating acceleration determining threshold value") $N1_{P0}$. The second differential-action limiting-condition determining means 91 makes a positive determination if both the two condition (a) and (b) are satisfied, while making a negative determination if either one of these two conditions (a) and (b) is unsatisfied.

The rotating acceleration determining threshold value $LMT2_{P0}$ and the rotating acceleration determining value $N1_{P0}$ represent determining values based on which if the rotation speed of the rotary element exceeds such determining values, it is predicted that the differential-portion planetary-gear rotation speed $N_{P0}$ will reach a high-speed rotation exceeding the rotation speed determining value $LMT1_{P0}$. In addition, the rotating acceleration determining value $N1_{P0}$ may take a fixed value. In an alternative, as shown in FIG. 10, the rotating acceleration determining value $N1_{P0}$ may be determined so as to vary such that the higher the rotating acceleration determining value $N1_{P0}$, th less will be the rotating acceleration determining value $N1_{P0}$.

If the first differential-action limiting-condition determining means 90 or the second differential-action limiting-condition determining means 91 makes a positive determination, the running state determining means 80 makes a positive determination. When this takes place, the differential action limiting means 86 causes the switching control means 50 to execute the C0-lock control. Since the C0-lock control is executed with a view to preventing the differential-portion planetary gear P0 from reaching a high-speed rotation, the switching clutch C0 is not necessarily placed in a completely engaged state but may be placed in a half-engaged (slipping) state.

FIG. 13 is a flowchart illustrating a basic sequence of major control operations to be executed with the electronic control device 118, i.e., control operations to be executed when preventing the differential-portion planetary-gear P0 from reaching a high-speed rotation. This sequence is repeatedly executed on an extremely short cycle in the order of, for instance, several milliseconds or several tens milliseconds. SC1 and SC5 to SC7, shown in FIG. 13, represent steps corresponding to SA1 and SA5 to SA7 of FIG. 11, respectively, which represent the first embodiment shown in FIG. 11. Hereunder, the control operations, shown in FIG. 13, will be described with a focus on points different from those of FIG. 11.

If the determination is made positive in SC1, then, the operation is executed in SC2 to determine if the condition (a) is satisfied. That is, the operation is executed to determine whether or not the absolute value of the differential-portion planetary-gear rotation speed $N_{P0}$, calculated using the formula (1), reaches a high-speed rotation exceeding the given differential-portion planetary-gear rotating acceleration determining threshold value $LMT2_{P0}$. If the determination is made positive in SC2, then, the operation goes to SC3 and if a negative determination is made in SC2, then, the operation goes to SC6.

In SC3, the operation is executed if the other condition (b) is satisfied. That is, the determination is made whether or not the rotating acceleration, representing an increment of the differential-portion planetary-gear rotation speed $N_{P0}$ per unit time, is a rapid increase in rotation that exceeds the rotating acceleration determining value $N1_{P0}$. If a positive determination is made in SC3, then, the operation goes to SC5 and if a negative determination is made in SC3, then, the operation goes to SC4. In this respect, SC2 and SC3 collectively correspond to the second differential-action limiting-condition determining means 91.

In SC4 corresponding to the first differential-action limiting-condition determining means 90, the operation is executed to determine whether or not the absolute value of the rotation speed $N_{P0}$ of the differential-portion planetary gear P0 reaches a high-speed rotation exceeding the rotation speed determining value $LMT1_{P0}$. If a positive determination is made in SC4, then, the operation goes to SC5 and if a negative determination is made in SC4, then, the operation goes to SC6.

The electronic control device 118 of the third embodiment has various advantageous effects (C1) to (C5) as listed below.

(C1) When the absolute value of the rotation speed $N_{P0}$ of the differential-portion planetary gear P0 reaches the high-speed rotation exceeding the rotation speed determining value $LMT1_{P0}$, the C0-lock control is executed. This allows the differential action to be limited, thereby suppressing an increase in rotation speed $N_{P0}$ of the differential-portion planetary gear P0. This prevents the occurrence of degradation in durability of the differential-portion planetary gear P0.

(C2) The C0-lock control is executed under various states described below. That is, such states occur when the absolute value of the differential-portion planetary-gear rotation speed $N_{P0}$ exceeds the rotating acceleration determining threshold value $LMT2_{P0}$ lower than the rotation speed determining value $LMT1_{P0}$ and when the rotating acceleration, representing the increment of the differential-portion planetary-gear rotation speed $N_{P0}$ per unit time, exceeds the rotating acceleration determining value $N1_{P0}$. Therefore, even when the rotation speed determining value $LMT1_{P0}$ does not exceed the differential-portion planetary-gear rotation speed $N_{P0}$, the C0-lock control is executed if the excess of the differential-portion planetary-gear rotation speed $N_{P0}$ over such a rotation speed determining value $LMT1_{P0}$ is predicted based on a variation in the differential-portion planetary-gear rotation speed $N_{P0}$. This allows the differential action to be limited, thereby suppressing an increase in the rotation speed $N_{P0}$ of the differential-portion planetary gear P0. This minimizes the occurrence of degradation in durability of the differential-portion planetary gear P0.

(C3) As shown in FIG. 10, the rotating acceleration determining value $N1_{P0}$ may be determined to vary depending on the differential-portion planetary-gear rotation speed $N_{P0}$ such that the higher the absolute value of the differential-portion planetary-gear rotation speed $N_{P0}$, the less will be the rotating acceleration determining value $N1_{P0}$. With the rotating acceleration determining value $N1_{P0}$ determined to be variable in such a way, the operation can be executed to more precisely predict if the differential-portion planetary-gear rotation speed $N_{P0}$ exceeds rotation speed determining value $LMT1_{P0}$ than that predicted when the rotating acceleration determining value $N1_{P0}$ is maintained at a fixed level.

(C4) With the C0-lock control being executed, the differential portion 11 is placed in the non-differential or nearly non-differential state with the first to third rotary elements RE1 to RE3 brought into a unitary rotation. This results in a capability of minimizing an increase in the rotation speed $N_{P0}$ of the differential-portion planetary gear P0 supported with the first rotary element RE1, thereby suppressing the occurrence of degradation in durability of the differential-portion planetary gear P0. The fuel cutoff operation may be executed to limit an increase in the engine rotation speed $N_E$ in synchronous with the operation executing the C0-lock control to allow the differential portion 11 to approach the non-differential state with the first to third rotary elements RE1 to RE3 brought into the unitary rotation. Such a case can further suppress an increase in the rotation speed $N_{P0}$ of the differential-portion planetary gear P0.

(C5) Either one of the clutches C1 and C2 or the brakes B1 to B3, incorporated in the automatic shifting portion 20, is rendered operative to function as a power interrupting section during the vehicle running for interrupting the power transmitting path extending from the power distributing mechanism 16 (differential portion 11) to the drive wheels 38. In such a case, with such a power transmitting path being interrupted, executing the C0-lock control based on the control operations, shown in FIG. 13, suppresses the occurrence of degradation in durability of the differential-portion planetary gear P0 caused by the high-speed rotation thereof. In addition, since both of the first and third embodiments have the same structures with the same functions, the third embodiment has the same advantageous effect as the effect (A6) of the first embodiment.

While the present invention has been described above with reference to the various embodiments shown in the accompanying drawings, the various embodiments described are meant to be illustrative only of mere examples of the present invention and the present invention can be implemented in various modifications or improvements in the light of knowledge of those skilled in the art.

For instance, in the first to third illustrated embodiments, when determining whether to execute the C0-lock control, the rotation speeds of the clutch of the automatic shifting portion 20, the second electric motor M2 and the differential-portion planetary gear P0 are used. However, in place of the rotation speeds of the rotary elements connected to the power transmitting path extending from the engine 8 to the drive wheels 38, other factors may be used including the vehicle speed V and the rotation speed of the power transmitting member 18 acting as the input shaft of the automatic shifting portion 20.

A rapid increase occurs in the rotation speeds of the clutch of the automatic shifting portion 20, the second electric motor M2 and the differential-portion planetary gear P0 when a rapid drop occurs in the input load acting on the input shaft (power transmitting member 18) of the automatic shifting portion 20 so as to cause a reduction in the rotation speed thereof. More particularly, such an occasion occurs when the power transmitting path is interrupted in the automatic shifting portion 20 due to the operation of the shift lever 49 being shifted into the "N" position during the vehicle running or when a rapid increase occurs in the speed ratio γ (=input-shaft rotation speed/output-shaft rotation speed) of the automatic shifting portion 20 due to a downshift being effectuated during the vehicle running. In the first to third illustrated embodiments, the determination on whether to execute the C0-lock control is made based on the rotation speed of and the related rotating acceleration of the clutch or the like of the automatic shifting portion 20, the second electric motor M2 and the differential-portion planetary gear P0.

However, it may be arranged that when a rapid drop takes place in the input load, acting on the input shaft (power transmitting member 18) of the automatic shifting portion 20 so as to minimize the rotation speed thereof, which causes a decrement of the input load per unit time to exceed a given input load reduction determining value, the C0-lock control is executed. In particular, such a circumstance may include a phase in which the power transmitting path is interrupted in the automatic shifting portion 20 or another phase in which an increment of the speed ratio γ of the automatic shifting portion 20 exceeds a given speed-ratio increment determining value.

As used herein, the terms "speed-ratio increment determining value" and "input load reduction determining value" refer to values based on which if the relevant values exceed such determining values, there is a likelihood of degradation occurring in durability of the rotary members such as the differential-portion planetary gear P0 incorporated in the differential portion 11 and the automatic shifting portion 20.

With such an arrangement, the C0-lock control is executed when the decrement of the input load per unit time, acting on the input shaft (power transmitting member 18) of the automatic shifting portion 20 so as to minimize the rotation speed thereof, rapidly decreases to a level beyond the input load reduction determining value. This allows the differential action to be limited, causing rotational resistance of the engine 8, connected to the power distributing mechanism 16, to suppress increases in the rotation speeds of the rotary elements such as the clutch or the brake of the automatic shifting portion 20, the second electric motor M2 and the differential-portion planetary gear P0. This prevents the occurrence of degradation in durability of these rotary members due to the high-speed rotations thereof.

When the power transmitting path is interrupted in the automatic shifting portion 20 due to the operation of the shift lever 49 shifted into the "N" position during the vehicle running, the C0-lock control is executed. This allows the differential action to be limited, causing rotational resistance of the engine 8, connected to the power distributing mechanism 16, to suppress increases in the rotation speeds of the rotary elements such as the clutch or the brake of the automatic shifting portion 20, the second electric motor M2 and the differential-portion planetary gear P0. This prevents the occurrence of degradation in durability of these rotary members due to the high-speed rotations thereof.

When the increment of the speed ratio γ of the automatic shifting portion 20 exceeds the speed-ratio increment determining value due to a reason arising from a downshift effectuated during the vehicle running, the C0-lock control is executed. This allows the differential action to be limited, causing rotational resistance of the engine 8, connected to the power distributing mechanism 16, to suppress increases in the rotation speeds of the rotary elements such as the clutch or the brake of the automatic shifting portion 20, the second electric motor M2 and the differential-portion planetary gear P0. This prevents the occurrence of degradation in durability of these rotary members due to the high-speed rotations thereof.

The first electric motor M1 may be drivably controlled in a direction to suppress the increases in the rotation speeds of the input shaft (power transmitting member 18) of the automatic shifting portion 20, the second electric motor M2 and the differential-portion planetary gear P0 in synchronous with the operation of the differential-action limiting means 86 for executing the C0-lock control in the first to third embodiments. In such a case, for instance, the first electric motor M1 is driven so as to increase the rotation speed $N_{S0}$ of the differential-portion sun gear S0 to allow the rotation speed $N_{S0}$ to approach the rotation speed $N_{R0}$ of the differential-portion ring gear R0 for thereby minimizing the differential action of the power distributing mechanism 16.

Drivably controlling the first electric motor M1 in synchronous with the operation of executing the C0-lock control in such a way mentioned above causes the differential portion 11 to approach the non-differential state with the first to third rotary elements RE1 to RE3 brought into the unitary rotation. This suppresses an increase in the rotation speed $N_{P0}$ of the differential-portion planetary gear P0. Further, this suppresses the rotation speed of the second electric motor M2 connected to the third rotary element RE3 and the rotation speed of the clutch or the brake, such as the first clutch C1 or the second clutch C2, of the automatic shifting portion 20, thereby preventing the occurrence of degradation in durability of such rotary elements due to the high-speed rotations thereof.

The fuel supply shutoff control may be executed in synchronous with the operation of the C0-lock control executed in the differential-action limiting means 86 in the first to third embodiments, thereby interrupting or limiting the supply of fuel to the engine 8. The fuel supply shutoff control is performed so as to limit the engine 8 from reaching the high-speed rotation beyond the engine rotation speed $N_E$ appearing at the beginning of the C0-lock control or to prevent the engine rotation speed $N_E$ from increasing to a level higher than a given value. When executing the fuel supply shutoff control, the fuel cutoff rotation speed, representing a threshold value for interrupting or limiting the supply of fuel with a view to preventing an overspeed of the engine 8, may be altered from a value of 5600 rpm to a value of 4800 rpm.

The fuel cutoff rotation speed may be or may not be altered depending on the rotation speed of the clutch or the brake of the automatic shifting portion 20, the second electric motor M2 or the differential-portion planetary gear P0. Initiating the fuel cutoff rotation in synchronous with the operation of executing the C0-lock control allows the differential portion 11 to approach the non-differential state under which the first to third rotary elements RE1 to RE3 are brought into a unitary rotation, thereby causing such a rotation speed to decrease to a level lower than a value equal to or nearly equal to the engine rotation speed $N_E$. This suppresses the rotation speed $N_{P0}$ of the differential-portion planetary gear P0. Further, this suppresses the rotation speed $N_{M2}$ of the second electric motor M2, connected to the third rotary element RE3, and the rotation speed of the rotary element such as the first clutch C1 or the second clutch C2 of the automatic shifting portion 20, thereby suppressing the occurrence of degradation in durability of such a rotary element due to the high-speed rotations thereof.

A fuel regulating-valve opening control may be executed in the first to third illustrated embodiments in synchronous with the operation of the differential-action limiting means 86 to execute the C0-lock control, thereby limiting the opening $\theta_{TH}$ of th electronic throttle valve 96 acting as a regulator valve for regulating the rate of fuel supplied to the engine 8. When executing the fuel regulating-valve opening control, the throttle valve opening $\theta_{TH}$ may be limited such that the engine rotation speed $N_E$ does not exceed, for instance, an upper limit of the engine rotation speed $N_E$. The upper limit of the engine rotation speed $N_E$ may be altered depending on the rotation speed of the clutch or the brake of the automatic shifting portion 20, the second electric motor M2 or the differential-portion planetary gear P0, or may not be altered.

With the fuel regulating-valve opening control executed in synchronous with the operation of executing the C0-lock control, the differential portion 11 is caused to approach the non-differential state under which the first to third rotary elements RE1 to RE3 are brought into a unitary rotation. This causes the rotation speed of the rotary element to decrease to a level lower than a value equal to or nearly equal to the engine rotation speed $N_E$, thereby suppressing the rotation speed $N_{P0}$ of the differential-portion planetary gear P0. Further, this suppresses the rotation speed $N_{M2}$ of the second electric motor M2, connected to the third rotary element RE3, and the rotation speed of the rotary element such as the first clutch C1 or the second clutch C2 of the automatic shifting portion 20, thereby suppressing degradation in durability of such a rotary element due to the high-speed rotations thereof.

In the first to third illustrated embodiments, a clutch or the like, functioning as the power interrupting section, may be provided in the power transmitting path extending from the engine 8 to the drive wheels 38 to be separate from the differential portion 11 and the automatic shifting portion 20.

In the first illustrated embodiment, the first clutch C1 or the second clutch C2 of the automatic shifting portion 20 is exemplified as the rotary element present on the power transmitting path extending from the power distributing mechanism 16 to the drive wheels 38 rotatably. However, such a rotary element is not limited to that incorporated in the automatic shifting portion 20 and may include a clutch or the like that can be provided in the power transmitting path to be separate from the automatic shifting portion 20.

In the first illustrated embodiment, it is construed that the rotary element, present on the power transmitting path rotatably, is not limited to the clutch engaging elements such as the clutch and the brake. The rotary element may include, for instance, a bearing, the third to eighth rotary elements RE3 to RE8 or the first to third planetary gear units P1 to P3. Accordingly, replacing the clutch and the brake such as the first clutch or the second clutch, exemplified in the first illustrated embodiment, by any one of the rotary elements discussed above suppresses degradation in durability of such a rotary element due to a high-speed rotation thereof.

In the third illustrated embodiment, the differential-portion planetary gear P0 is disclosed as the rotary element incorporated in the differential-portion planetary gear unit 24. However, the rotary element is not limited to such a rotary element and the rotary element, incorporated in the differential-portion planetary gear unit 24, may include a bearing, the first to third rotary elements RE1 to RE3, the switching clutch B0 or the switching clutch C0.

For instance, the differential portion 11 (power distributing mechanism 16) has been described above as having the function to operate as the electrically controlled continuously variable transmission with the speed ratio γ0 enabled to continuously vary in the value ranging from the minimum value γ0min to the maximum value γ0max. It may suffice for, for instance, the speed ratio γ0 of the differential portion 11 not to be continuously stepwise but to be stepwise varied upon daringly utilizing the differential action.

While the shifting mechanism 10 has been described above with reference to the structure in which the engine 8 and the differential portion are directly connected to each other, it may suffice for the engine 8 to be connected to the differential portion 11 via a clutch engaging element such as a clutch.

Although the automatic shifting portion 20 is connected to the power transmitting path extending from the engine 8 to the drive wheels 38 at a position next to the differential portion 11, the differential portion 11 may be connected in sequence to the output of the automatic shifting portion 20.

The differential portion 11 and the automatic shifting portion 20 are connected to each other in series in the structure shown FIG. 1 in the first to third embodiments. However, the present invention can be applied to a structure even if the differential portion 11 and the automatic shifting portion 20 are mechanically independent from each other, provided that a whole of the shifting mechanism 10 has a function to achieve an electrically controlled differential action enabling a differential state to be electrically varied, and a function to perform a shifting on a principle different from the function of the electrically controlled differential action. While the power distributing mechanism 16, having been described above as of the single planetary type in the first to third embodiments, may be of a doubled-planetary type.

The various embodiments have been described above with reference to the structure wherein the engine 8 is connected to the first rotary element RE1 of the differential-portion planetary gear unit 24 for drive-force transmitting capability, the first electric motor M2 is connected to the second rotary element RE2 for drive-force transmitting capability, and the power transmitting path for the drive wheels 38 is connected to the third rotary element RE3. However, the present invention may be applied to such a structure including, for instance, two planetary gear units wherein partial rotary elements, forming such planetary gear units, are connected to each other. With such a structure, an engine, an electric motor and drive wheels are connected to the rotary elements of the planetary gear units for drive-force transmitting capability such that a clutch or a brake, connected to the rotary elements of the planetary gear units, can be controlled to switch a shifting mode between a step-variable shifting mode and a continuously variable shifting mode.

Although the first to third illustrated embodiments have been described as having the automatic shifting portion 20 in the form of the shifting portion functioning as the automatic transmission, the automatic shifting portion 20 may include a shifting portion functioning as a manual transmission.

In the first to third illustrated embodiments, the first electric motor M1 and the second rotary element RE2 are directly connected to each other and the second electric motor M2 and the third rotary element RE3 are directly connected to each other. However, the first electric motor M1 and the second rotary element RE2 may be connected to each other via a clutch engaging element such as a clutch or the like and the second electric motor M2 and the third rotary element RE3 may be connected to each other via a clutch engaging element such as a clutch or the like.

The first to third illustrated embodiments may be implemented in combination with, for instance, a priority order in consideration.

What is claimed is:

1. A control device for a hybrid vehicle drive apparatus, wherein
    the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same;
    the differential mechanism includes a differential-action limiting device enabling the differential action of the differential mechanism to be limited; and
    the control device is operative to cause the differential-action limiting device to limit the differential action of the differential mechanism, when the power transmitting path is interrupted by the power interrupting section during a vehicle running, and a rotation speed of a rotary element, present on the power transmitting path rotatably, exceeds a given rotary-element rotation speed determining value; and
    when the power transmitting path is interrupted by the power interrupting section during the vehicle running, and the rotation speed of the rotary element exceeds the given rotary-element rotation speed determining value, the control device is operative to execute at least one of a drive control for driving the first electric motor so as to lower the rotation speed, a fuel supply stop control for stopping or limiting a fuel supply to the engine, and a fuel regulating-valve opening control for limiting an opening of a regulating valve for regulating intake air quantity being supplied to the engine.

2. A control device for a hybrid vehicle drive apparatus, wherein
    the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same;
    the differential mechanism includes a differential-action limiting device enabling the differential action of the differential mechanism to be limited; and
    the control device is operative to cause the differential-action limiting device to limit the differential action of the differential mechanism, when the power transmitting path is interrupted by the power interrupting section during a vehicle running, and an increment of a rotation speed per unit time of a rotary element, present on the power transmitting path rotatably, exceeds a given rotary-element rotating acceleration determining value.

3. The control device for a hybrid vehicle drive apparatus according to claim 2, wherein the rotary-element rotating acceleration determining value is determined depending on the rotation speed of the rotary element.

4. The control device for a hybrid vehicle drive apparatus according to claim 2, wherein when the increment of the rotation speed per unit time of the rotary element exceeds the given rotary-element rotating acceleration determining value, the control device is operative to execute at least one of a drive control for driving the first electric motor so as to lower the rotation speed, a fuel supply stop control for stopping or limiting a fuel supply to the engine, and a fuel regulating-valve opening control for limiting an opening of a regulating valve for regulating intake air quantity being supplied to the engine.

5. The control device for a hybrid vehicle drive apparatus according to claim 1, wherein
    the hybrid vehicle drive apparatus is provided with an engaging element enabling the power transmitting path to be interrupted; and
    the rotation speed of the rotary element is a relative rotation speed of engaging members forming the engaging element.

6. The control device for a hybrid vehicle drive apparatus according to claim 2, wherein
    the hybrid vehicle drive apparatus is provided with an engaging element enabling the power transmitting path to be interrupted; and
    the rotation speed of the rotary element is a relative rotation speed of engaging members forming the engaging element.

7. A control device for a hybrid vehicle drive apparatus, wherein
    the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same;
    the differential mechanism includes a differential-action limiting device enabling the differential action of the differential mechanism to be limited; and
    the control device is operative to cause the differential-action limiting device to limit the differential action of the differential mechanism, when the power transmitting path is interrupted by the power interrupting section during a vehicle running, and a rotation speed of the second electric motor exceeds a given second-motor rotation speed determining value; and when the power transmitting path is interrupted by the power interrupting section during a vehicle running, and the rotation speed of the second electric motor exceeds the given second-motor rotation speed determining value, the control device is operative to execute at least one of a drive control for driving the first electric motor so as to lower the rotation speed, a fuel supply stop control for stopping or limiting a fuel supply to the engine, and a fuel regulating-valve opening control for limiting an opening of a regulating valve for regulating intake air quantity being supplied to the engine.

8. A control device for a hybrid vehicle drive apparatus, wherein the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same;

the differential mechanism includes a differential-action limiting device enabling the differential action of the differential mechanism to be limited; and the control device is operative to cause the differential-action limiting device to limit the differential action of the differential mechanism, when the power transmitting path is interrupted by the power interrupting section during a vehicle running, and an increment of a rotation speed per unit time of the second electric motor exceeds a given second-motor rotating acceleration determining value.

9. The control device for a hybrid vehicle drive apparatus according to claim 8, wherein the second-motor rotating acceleration determining value is determined depending on the rotation speed of the second electric motor.

10. The control device for a hybrid vehicle drive apparatus according to claim 8, wherein when the increment of the rotation speed per unit time of the second motor exceeds the given second-motor rotating acceleration determining value, the control device is operative to execute at least one of a drive control for driving the first electric motor so as to lower the rotation speed, a fuel supply stop control for stopping or limiting a supply of fuel to the engine, and a fuel regulating-valve opening control for limiting an opening of a regulating valve for regulating the intake air quantity being supplied to the engine.

11. A control device for a hybrid vehicle drive apparatus, wherein the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same;

the differential mechanism includes a differential-action limiting device enabling the differential action of the differential mechanism to be limited; and the control device is operative to cause the differential-action limiting device to limit the differential action of the differential mechanism, when the power transmitting path is interrupted by the power interrupting section during a vehicle running, and an absolute value of a rotation speed of a rotary element, incorporated in a planetary gear unit included in the differential mechanism, exceeds a given planetary-gear-unit rotation speed determining value; and when the power transmitting path is interrupted by the power interrupting section during the vehicle running, and the rotation speed of the rotary element exceeds the given rotary-element rotation speed determining value, the control device is operative to execute at least one of a drive control for driving the first electric motor so as to lower the rotation speed, a fuel supply stop control for stopping or limiting a fuel supply to the engine, and a fuel regulating-valve opening control for limiting an opening of a regulating valve for regulating intake air quantity being supplied to the engine.

12. A control device for a hybrid vehicle drive apparatus, wherein the hybrid vehicle drive apparatus comprises an electrically controlled differential portion including a differential mechanism, connected to an engine in a drive-force transmissive state, whose differential state is controlled with controlling an operating state of a first electric motor, a second electric motor connected to a power transmitting path extending from the differential mechanism to drive wheels, and a power interrupting section forming part of the power transmitting path and operative to interrupt the same;

the differential mechanism includes a differential-action limiting device enabling the differential action of the differential mechanism to be limited; and the control device is operative to cause the differential-action limiting device to limit the differential action of the differential mechanism, when the power transmitting path is interrupted by the power interrupting section during a vehicle running, and an increment of an absolute value of a rotation speed per unit time of a rotary element, incorporated in a planetary gear unit included in the differential mechanism, exceeds a given planetary-gear-unit rotating acceleration determining value.

13. The control device for a hybrid vehicle drive apparatus according to claim 12, wherein the planetary-gear-unit rotating acceleration determining value is determined depending on the absolute value of the rotation speed of the rotary element incorporated in the planetary gear unit.

14. The control device for a hybrid vehicle drive apparatus according to claim 11, wherein when the absolute value of the rotation speed of the rotary element incorporated in the planetary gear unit exceeds the planetary-gear-unit rotation speed determining value, the control device is operative to execute at least one of a drive control for driving the first electric motor so as to lower the rotation speed, a fuel supply stop control for stopping or limiting a supply of fuel to the engine, and a fuel regulating-valve opening control for limiting an opening of a regulating valve for regulating the intake air quantity being supplied to the engine.

15. The control device for a hybrid vehicle drive apparatus according to claim 12, wherein when the increment of the absolute value of the rotation speed per unit time of the rotary element incorporated in the planetary gear unit exceeds the planetary-gear-unit rotating acceleration determining value, the control device is operative to execute at least one of a drive control for driving the first electric motor so as to lower the rotation speed, a fuel supply stop control for stopping or limiting a supply of fuel to the engine, and a fuel regulating-valve opening control for limiting an opening of a regulating valve for regulating the intake air quantity being supplied to the engine.

16. The control device for a hybrid vehicle drive apparatus according to claim 1, wherein the power interrupting section is an engaging element, which is able to interrupt the power transmitting path and is incorporated in a mechanical shifting portion functioning as a transmission.

17. The control device for a hybrid vehicle drive apparatus according to claim 2, wherein the power interrupting section is an engaging element, which is able to interrupt the power transmitting path and is incorporated in a mechanical shifting portion functioning as a transmission.

18. The control device for a hybrid vehicle drive apparatus according to claim 7, wherein the power interrupting section is an engaging element, which is able to interrupt the power transmitting path and is incorporated in a mechanical shifting portion functioning as a transmission.

19. The control device for a hybrid vehicle drive apparatus according to claim 8, wherein the power interrupting section is an engaging element, which is able to interrupt the power transmitting path and is incorporated in a mechanical shifting portion functioning as a transmission.

20. The control device for a hybrid vehicle drive apparatus according to claim 11, wherein the power interrupting section is an engaging element, which is able to interrupt the power transmitting path and is incorporated in a mechanical shifting portion functioning as a transmission.

21. The control device for a hybrid vehicle drive apparatus according to claim 12, wherein the power interrupting section is an engaging element, which is able to interrupt the power transmitting path and is incorporated in a mechanical shifting portion functioning as a transmission.

22. The control device for a hybrid vehicle drive apparatus according to claim 1, wherein the rotary element, present on the power transmitting path rotatably, is a rotary element incorporated in a planetary gear unit forming a mechanical shifting portion functioning as a transmission.

23. The control device for a hybrid vehicle drive apparatus according to claim 2, wherein the rotary element, present on the power transmitting path rotatably, is a rotary element incorporated in a planetary gear unit forming a mechanical shifting portion functioning as a transmission.

24. The control device for a hybrid vehicle drive apparatus according to claim 11, wherein the rotary element incorporated in the planetary gear unit is planetary gears of the planetary gear unit.

25. The control device for a hybrid vehicle drive apparatus according to claim 12, wherein the rotary element incorporated in the planetary gear unit is planetary gears of the planetary gear unit.

26. The control device for a hybrid vehicle drive apparatus according to claim 1, wherein
the differential mechanism includes a first rotary element connected to the engine in a drive-force transmissive state, a second rotary element connected to the first electric motor in a drive-force transmissive state, and a third rotary element connected to the power transmitting path extending to the drive wheels; and
the differential-action limiting device is operative to suppress a relative rotation of at least two rotary elements among the first to third rotary elements for thereby limiting the differential action of the differential mechanism.

27. The control device for a hybrid vehicle drive apparatus according to claim 2, wherein
the differential mechanism includes a first rotary element connected to the engine in a drive-force transmissive state, a second rotary element connected to the first electric motor in a drive-force transmissive state, and a third rotary element connected to the power transmitting path extending to the drive wheels; and
the differential-action limiting device is operative to suppress a relative rotation of at least two rotary elements among the first to third rotary elements for thereby limiting the differential action of the differential mechanism.

28. The control device for a hybrid vehicle drive apparatus according to claim 7, wherein
the differential mechanism includes a first rotary element connected to the engine in a drive-force transmissive state, a second rotary element connected to the first electric motor in a drive-force transmissive state, and a third rotary element connected to the power transmitting path extending to the drive wheels; and
the differential-action limiting device is operative to suppress a relative rotation of at least two rotary elements among the first to third rotary elements for thereby limiting the differential action of the differential mechanism.

29. The control device for a hybrid vehicle drive apparatus according to claim 8, wherein
the differential mechanism includes a first rotary element connected to the engine in a drive-force transmissive state, a second rotary element connected to the first electric motor in a drive-force transmissive state, and a third rotary element connected to the power transmitting path extending to the drive wheels; and
the differential-action limiting device is operative to suppress a relative rotation of at least two rotary elements among the first to third rotary elements for thereby limiting the differential action of the differential mechanism.

30. The control device for a hybrid vehicle drive apparatus according to claim 11, wherein
the differential mechanism includes a first rotary element connected to the engine in a drive-force transmissive state, a second rotary element connected to the first electric motor in a drive-force transmissive state, and a third rotary element connected to the power transmitting path extending to the drive wheels; and
the differential-action limiting device is operative to suppress a relative rotation of at least two rotary elements among the first to third rotary elements for thereby limiting the differential action of the differential mechanism.

31. The control device for a hybrid vehicle drive apparatus according to claim 12, wherein
the differential mechanism includes a first rotary element connected to the engine in a drive-force transmissive state, a second rotary element connected to the first electric motor in a drive-force transmissive state, and a third rotary element connected to the power transmitting path extending to the drive wheels; and
the differential-action limiting device is operative to suppress a relative rotation of at least two rotary elements among the first to third rotary elements for thereby limiting the differential action of the differential mechanism.

32. The control device for a hybrid vehicle drive apparatus according to claim 1, wherein the electrically controlled differential portion is rendered operative as a continuously variable transmission with controlling the operating state of the first electric motor.

33. The control device for a hybrid vehicle drive apparatus according to claim 2, wherein the electrically controlled differential portion is rendered operative as a continuously variable transmission with controlling the operating state of the first electric motor.

34. The control device for a hybrid vehicle drive apparatus according to claim 7, wherein the electrically controlled differential portion is rendered operative as a continuously variable transmission with controlling the operating state of the first electric motor.

35. The control device for a hybrid vehicle drive apparatus according to claim 8, wherein the electrically controlled differential portion is rendered operative as a continuously variable transmission with controlling the operating state of the first electric motor.

36. The control device for a hybrid vehicle drive apparatus according to claim 11, wherein the electrically controlled differential portion is rendered operative as a continuously variable transmission with controlling the operating state of the first electric motor.

37. The control device for a hybrid vehicle drive apparatus according to claim 12, wherein the electrically controlled differential portion is rendered operative as a continuously variable transmission with controlling the operating state of the first electric motor.

38. The control device for a hybrid vehicle drive apparatus according to claim 1, wherein the control device includes differential action limiting condition determining means for determining whether or not a predetermined differential limiting condition is satisfied, running state determining means for determining whether or not the vehicle is running in a predetermined condition, and differential action limiting means for causing the differential-action limiting device to limit the differential action of the differential mechanism.

39. The control device for a hybrid vehicle drive apparatus according to claim 1, wherein limitation of the differential action of the differential mechanism caused by the differential-action limiting device is executed upon rapid drop of a load acted on an output shaft of the electrically operated differential portion.

* * * * *